Oct. 28, 1941.　　　M. P. NEAL　　　2,260,330
DUPLICATING APPARATUS
Filed April 7, 1939　　　17 Sheets-Sheet 1

Inventor:
Morris P. Neal
By
Attorneys

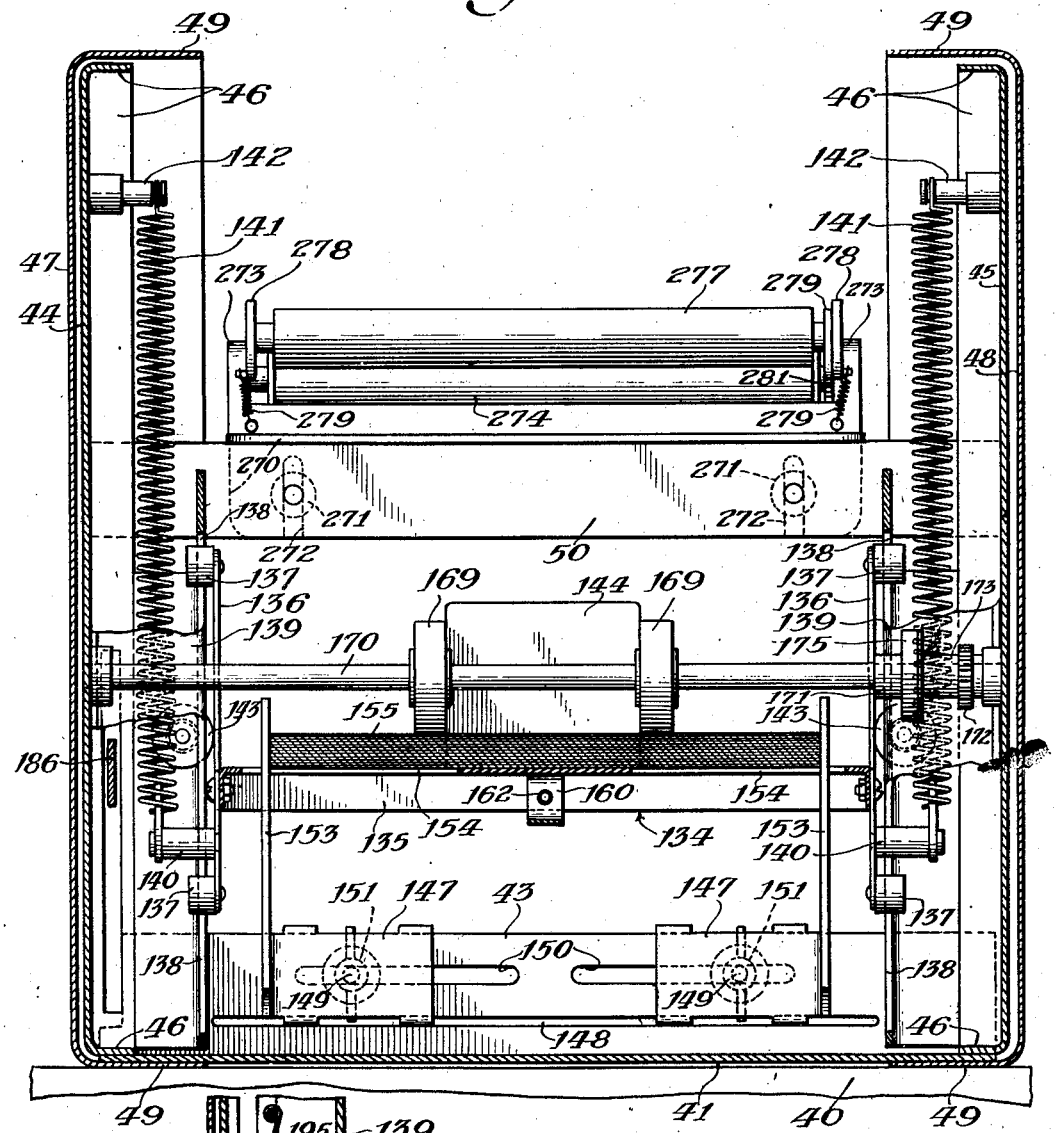

Oct. 28, 1941.                M. P. NEAL                2,260,330
                        DUPLICATING APPARATUS
                    Filed April 7, 1939      17 Sheets-Sheet 4
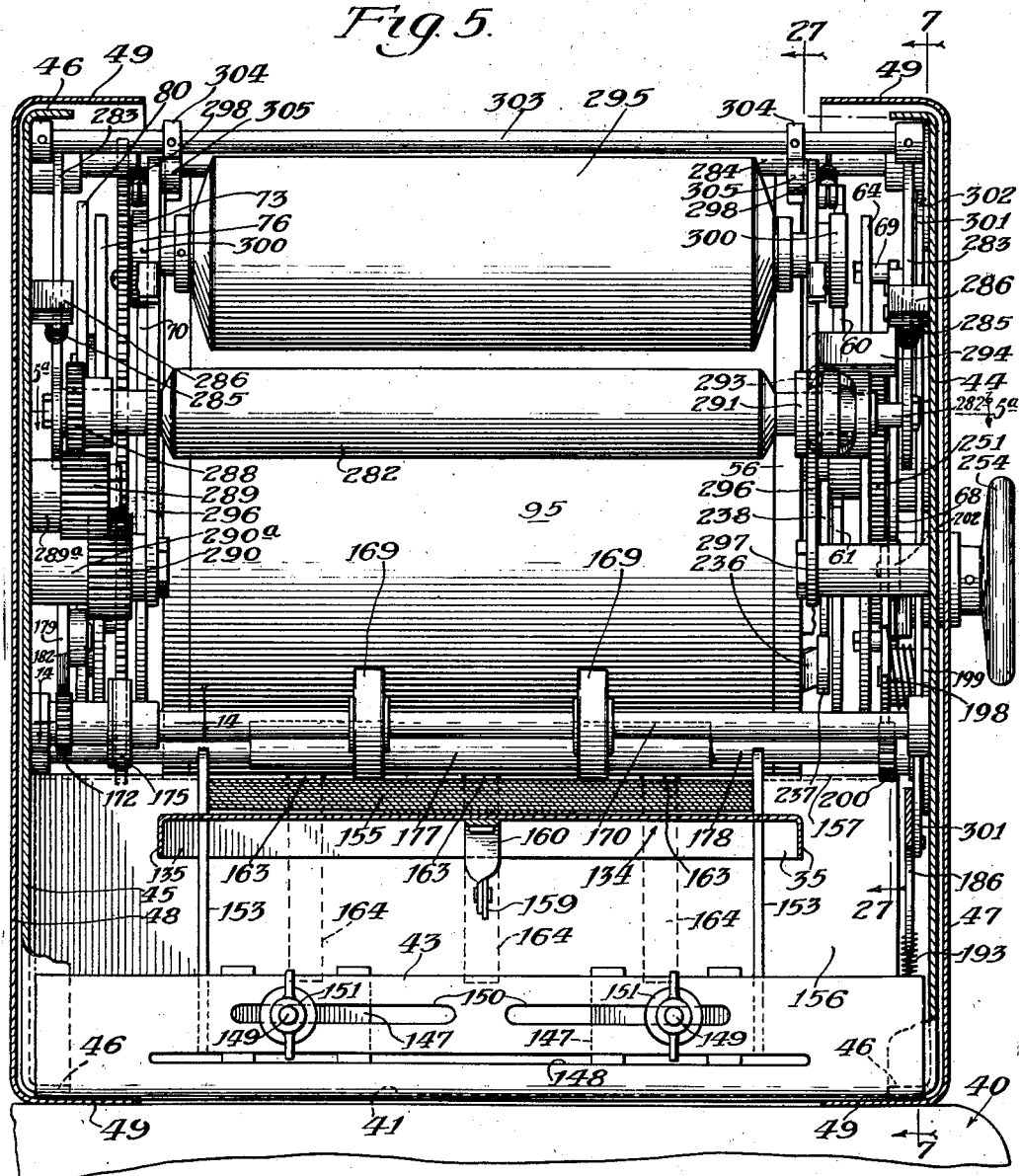
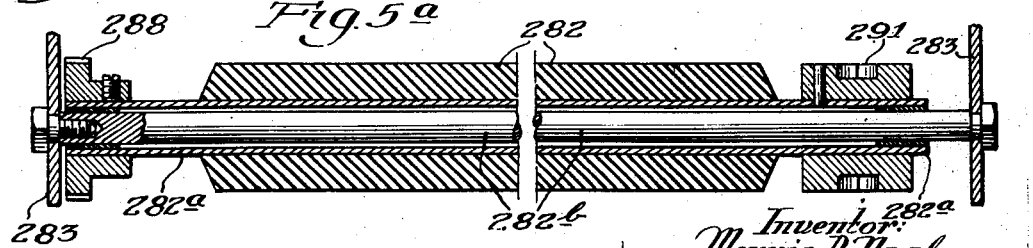

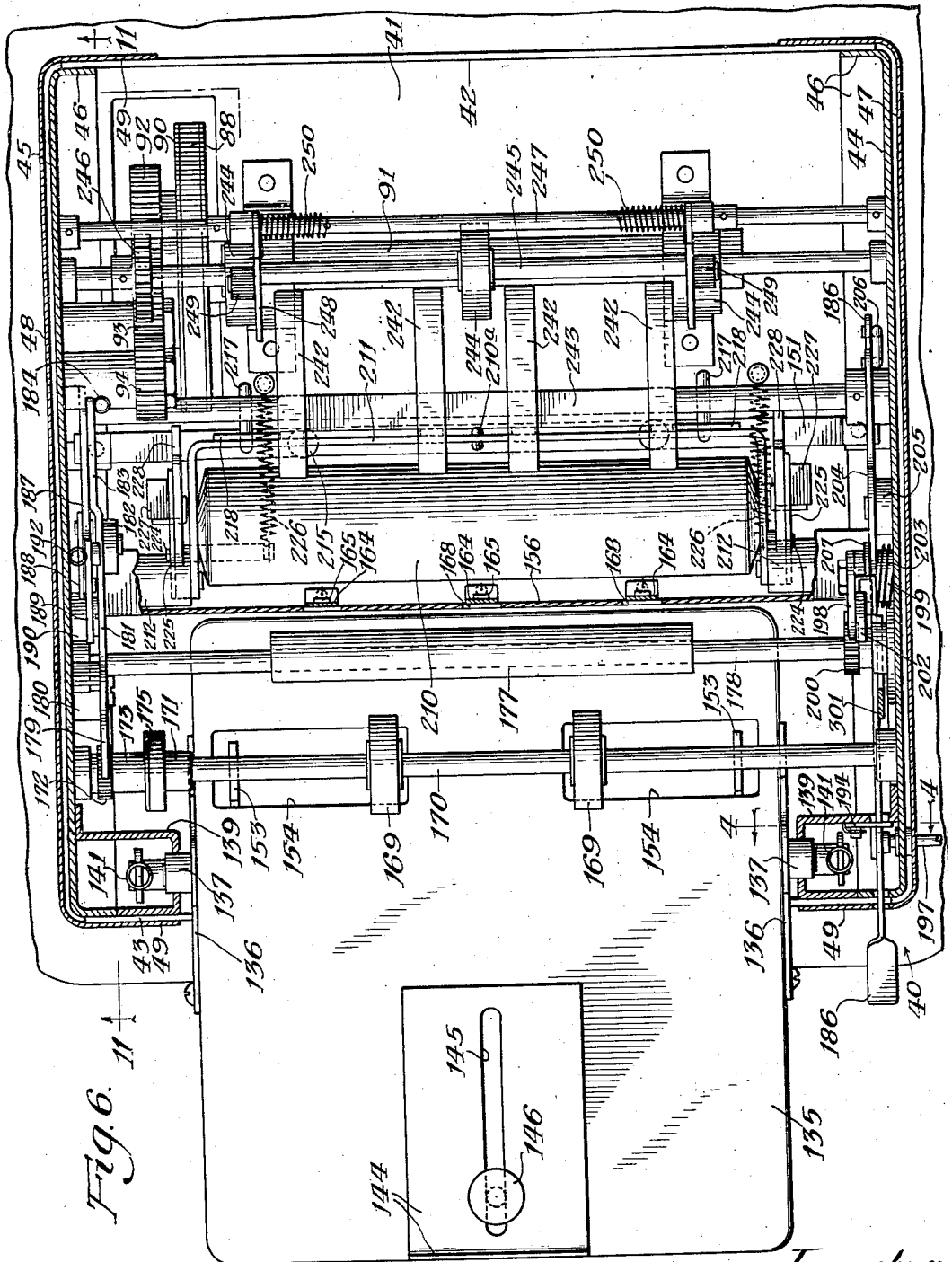

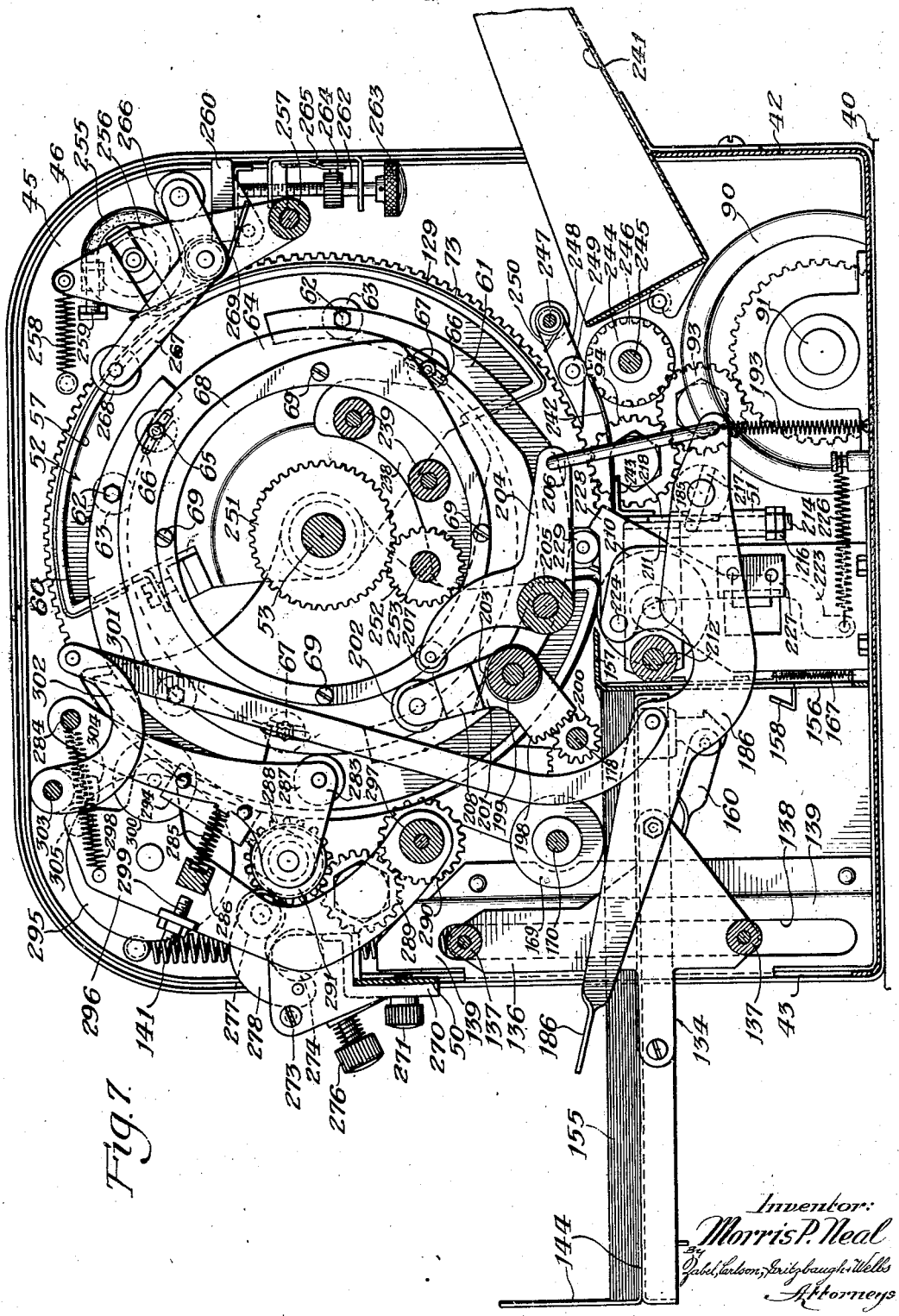

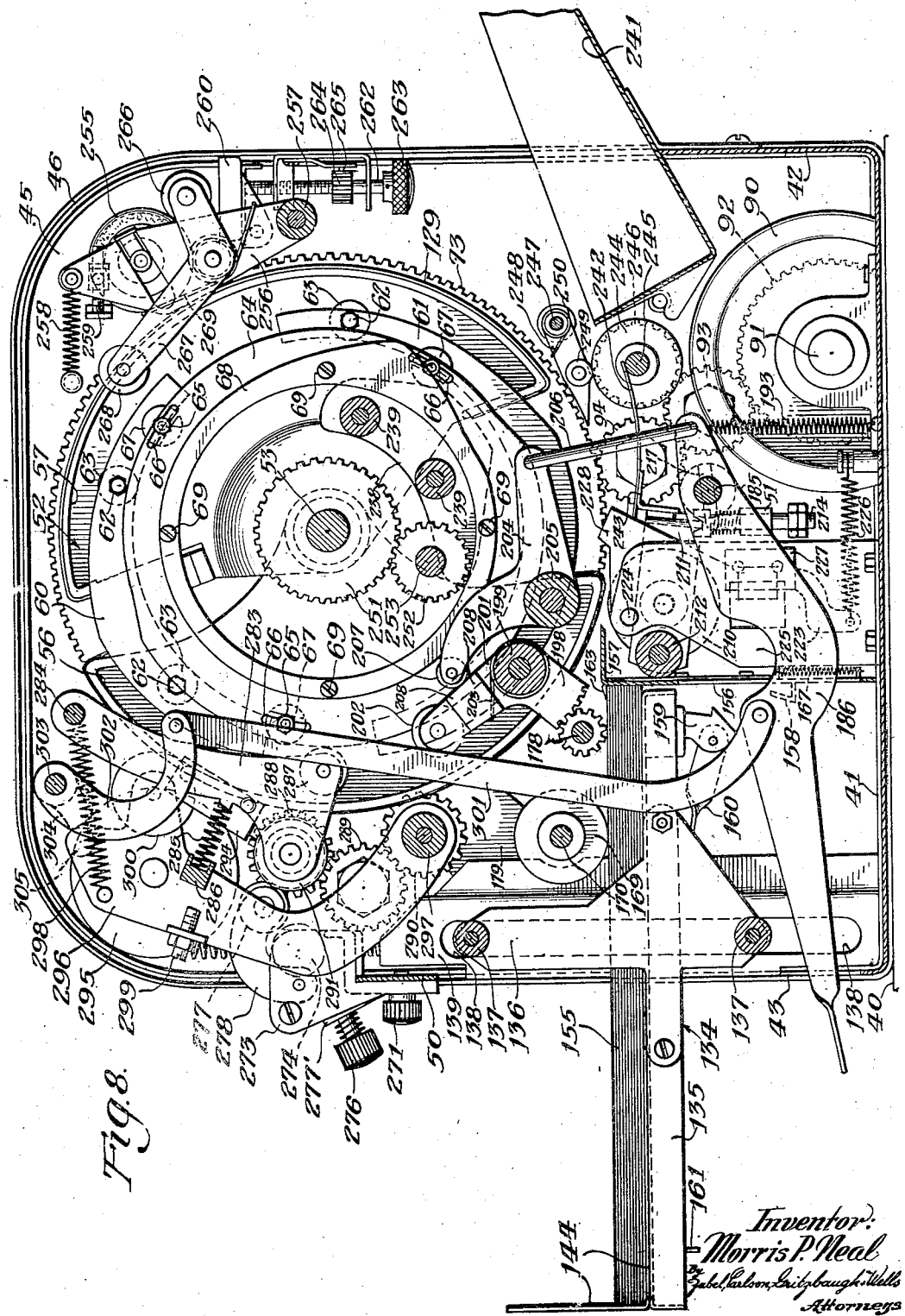

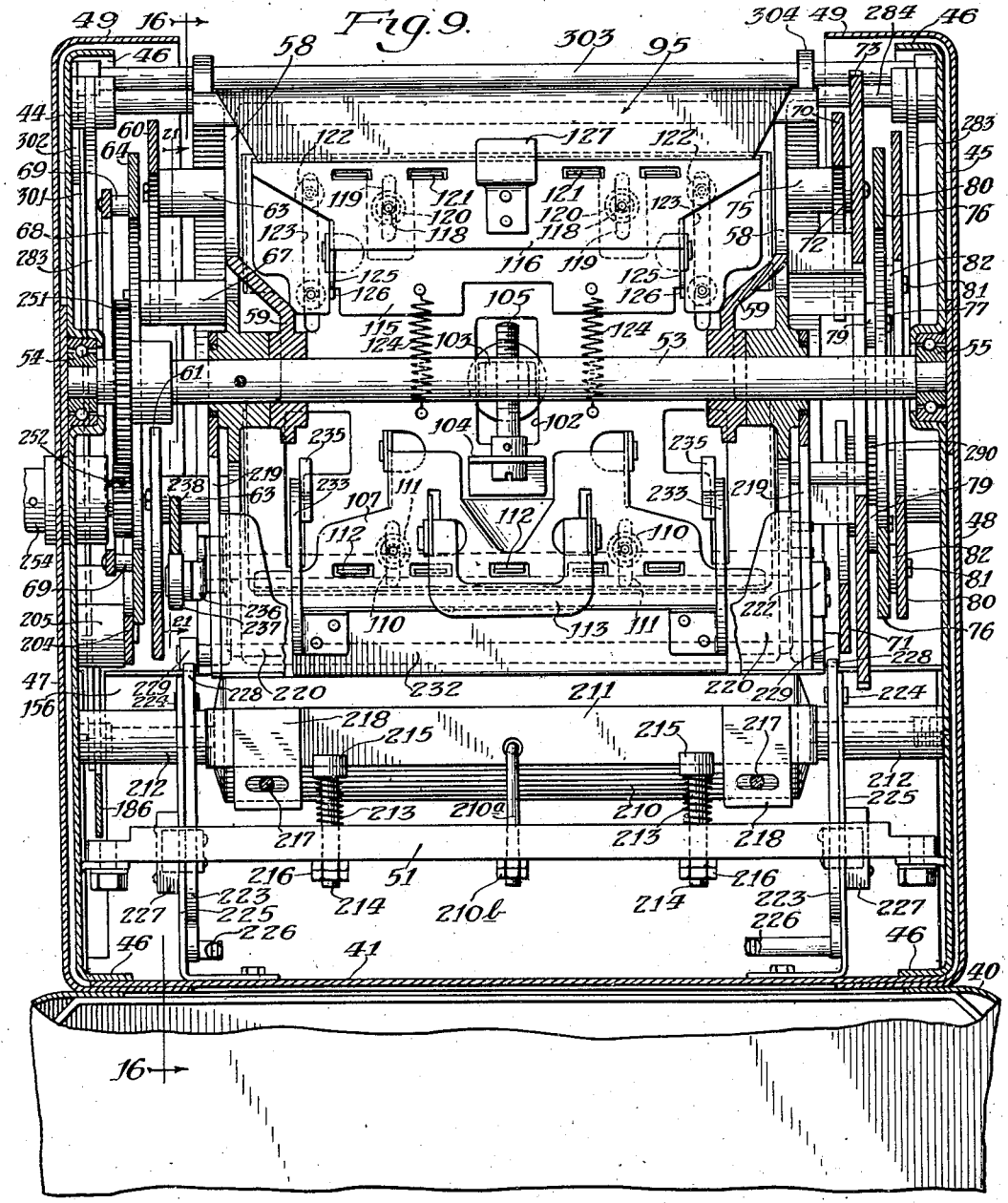

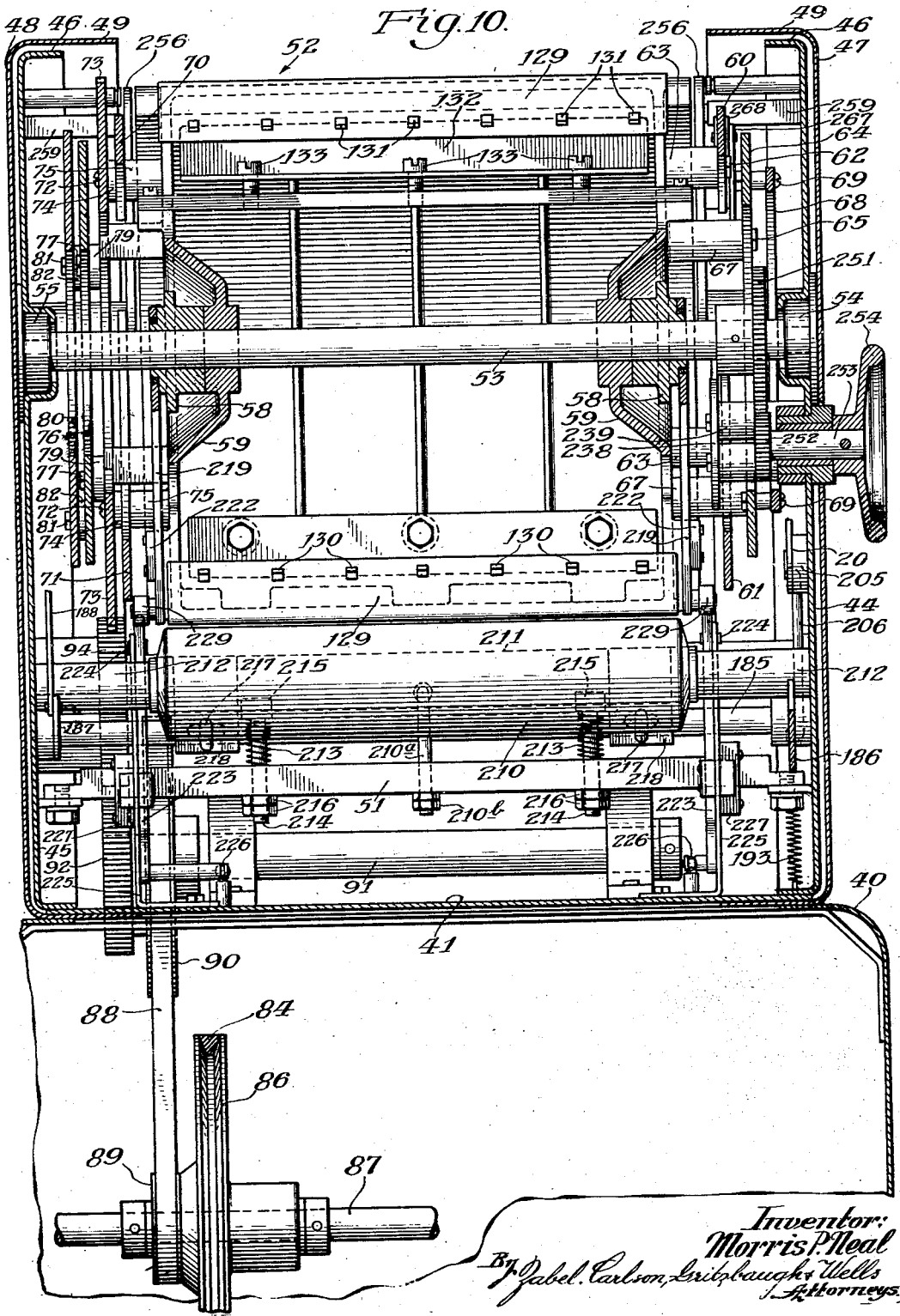

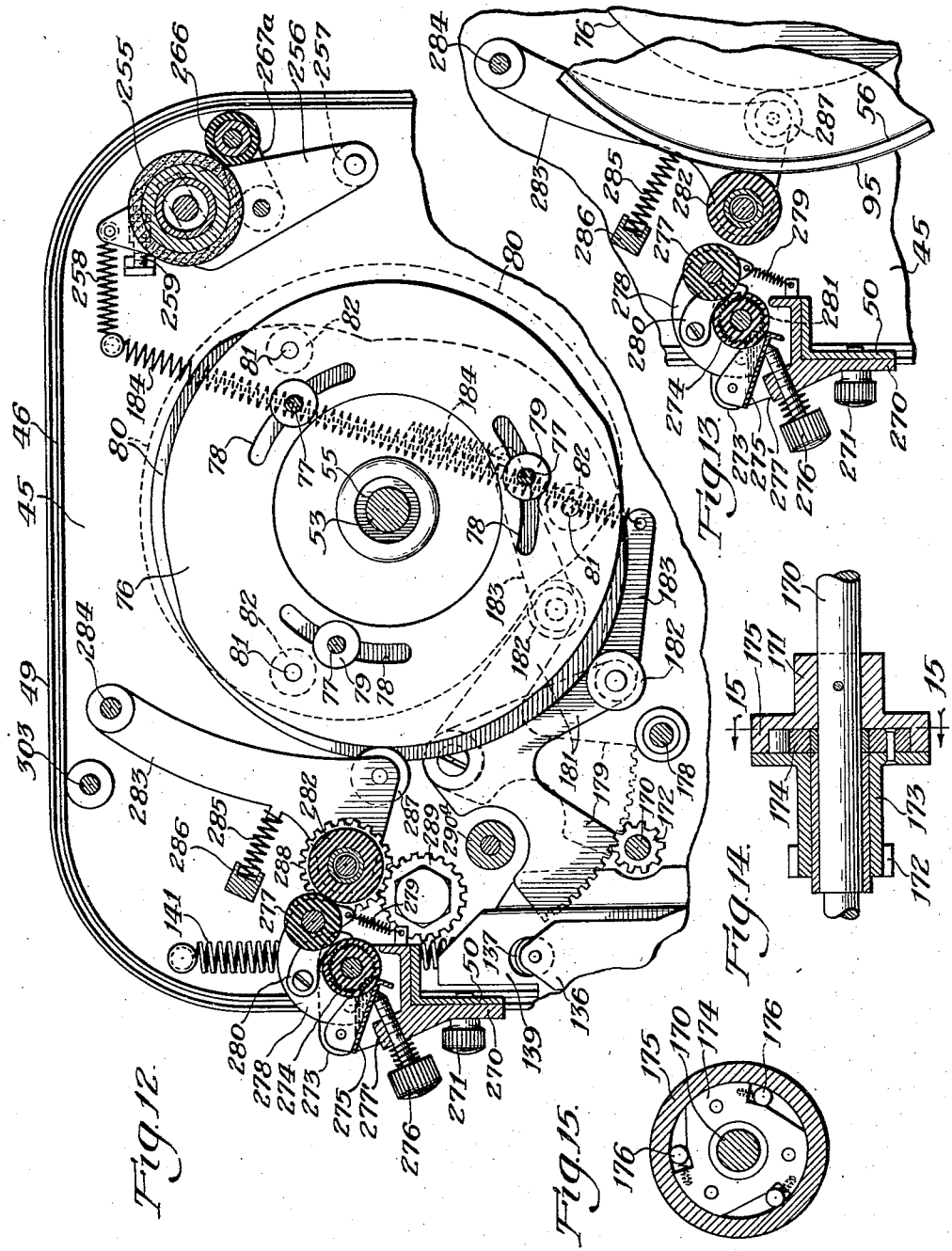

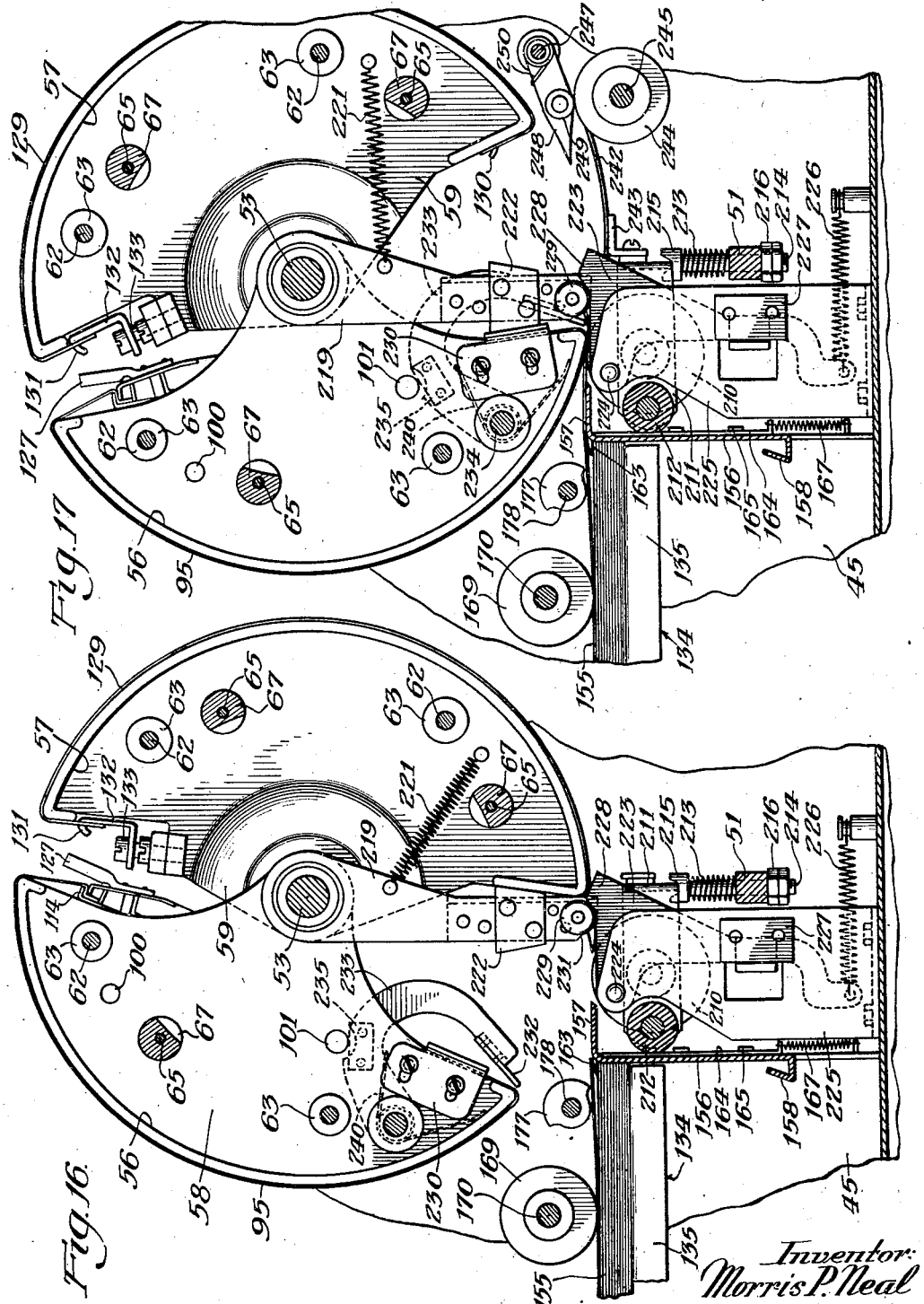

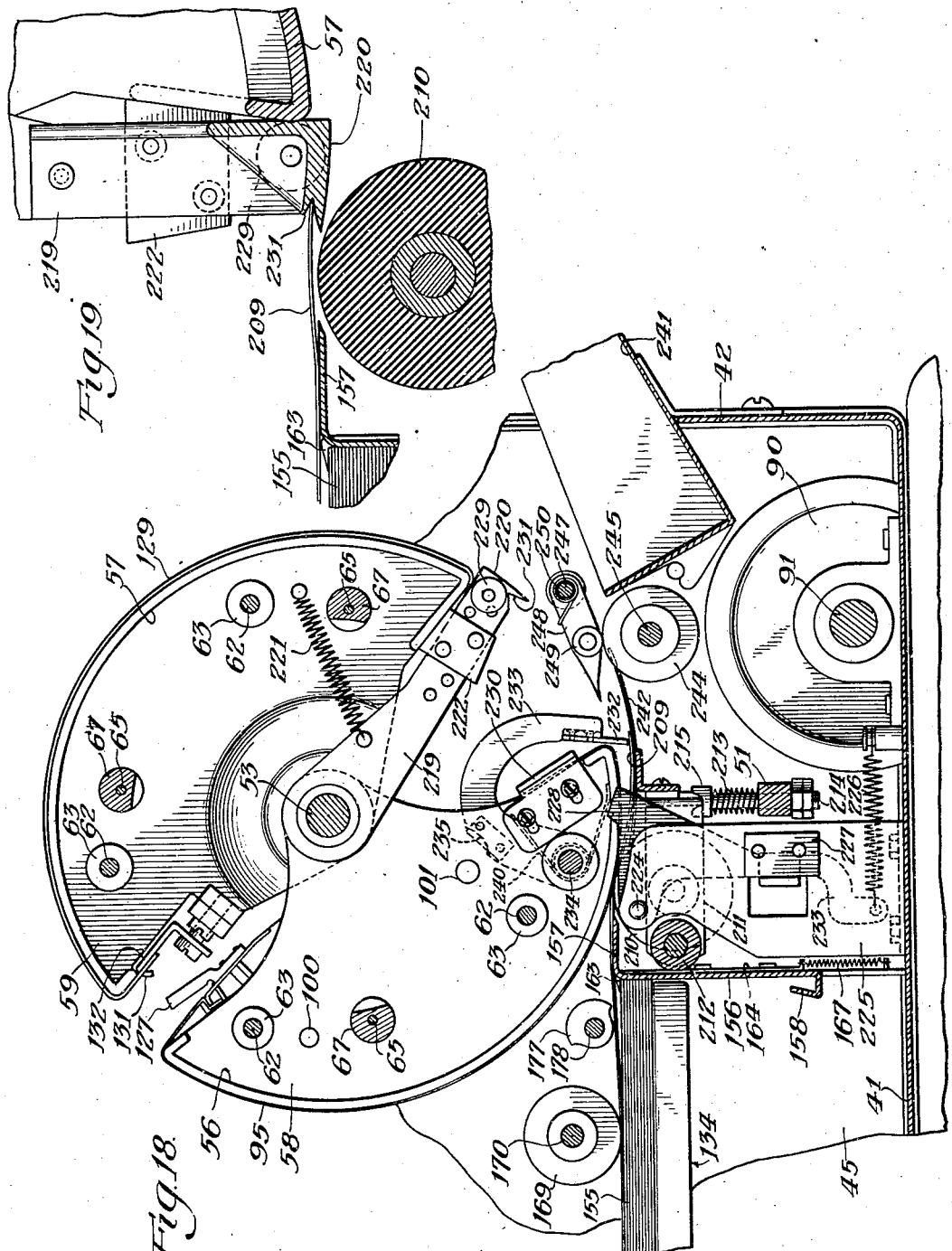

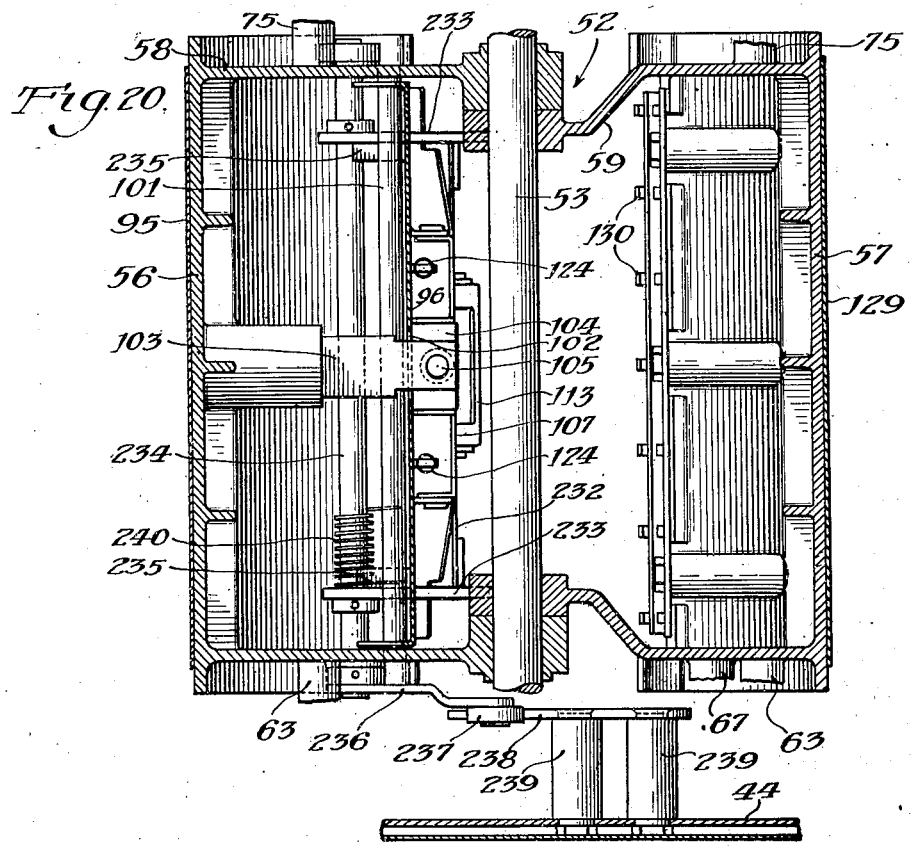
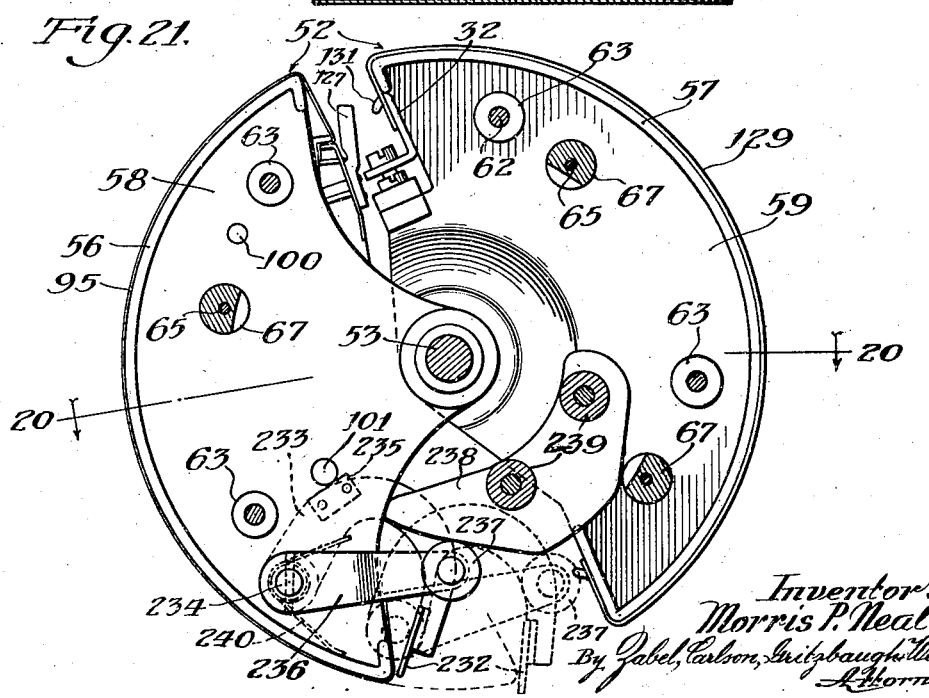

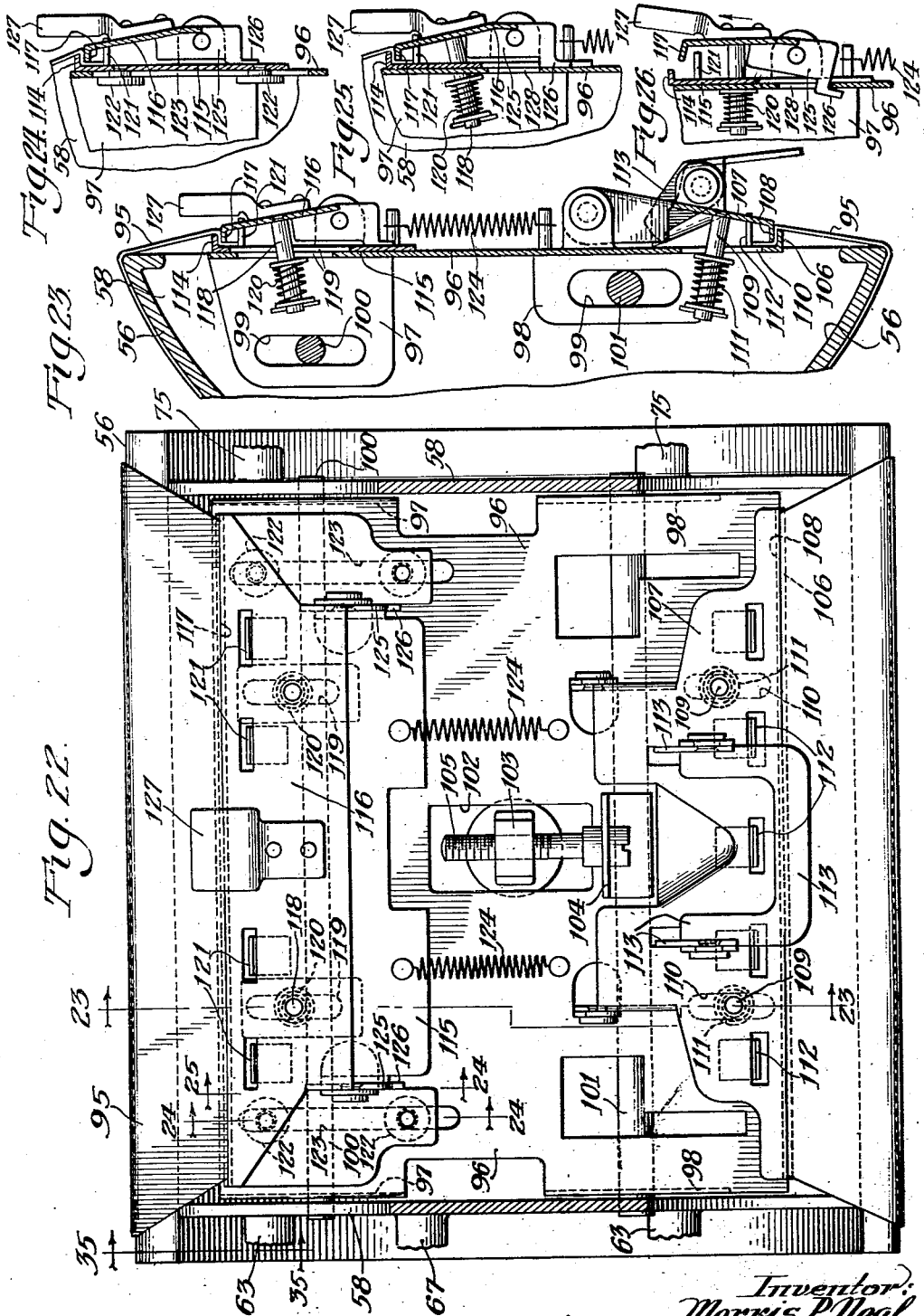

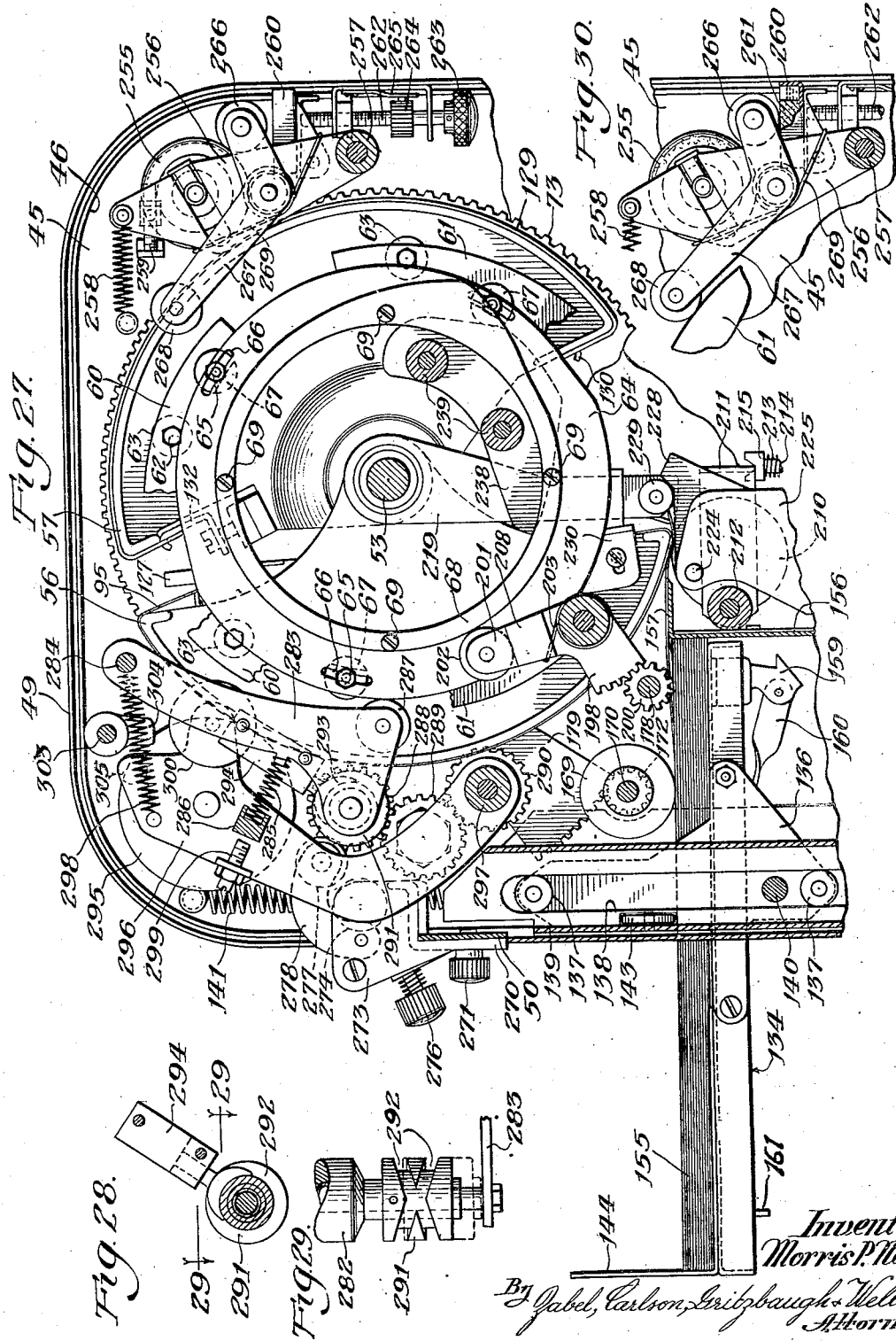

Oct. 28, 1941.     M. P. NEAL     2,260,330
DUPLICATING APPARATUS
Filed April 7, 1939     17 Sheets-Sheet 17
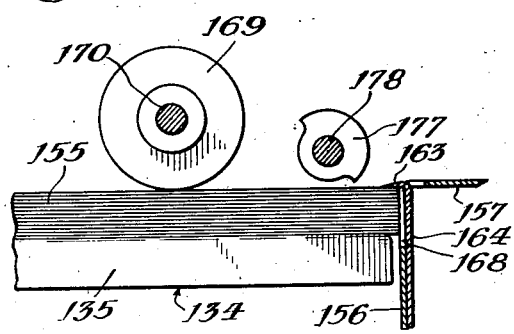
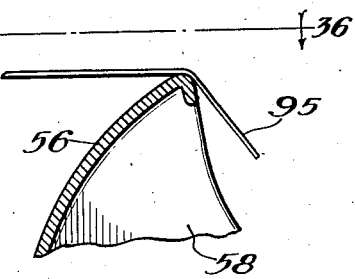
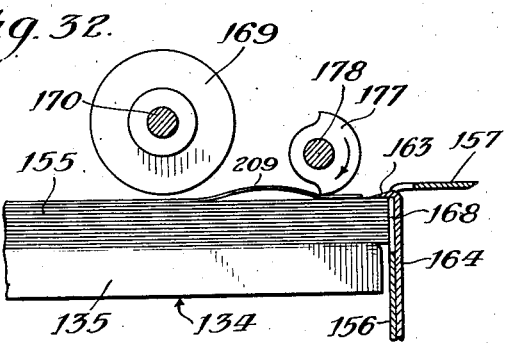
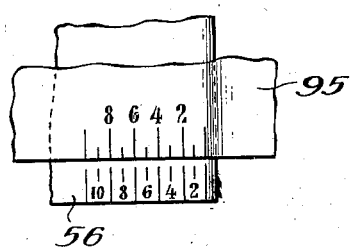
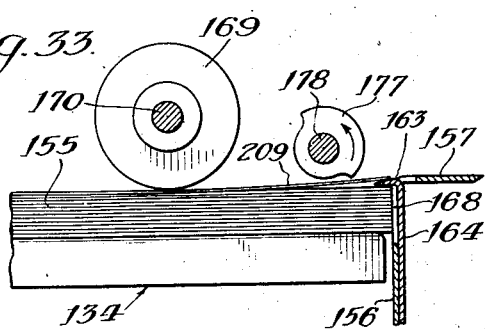
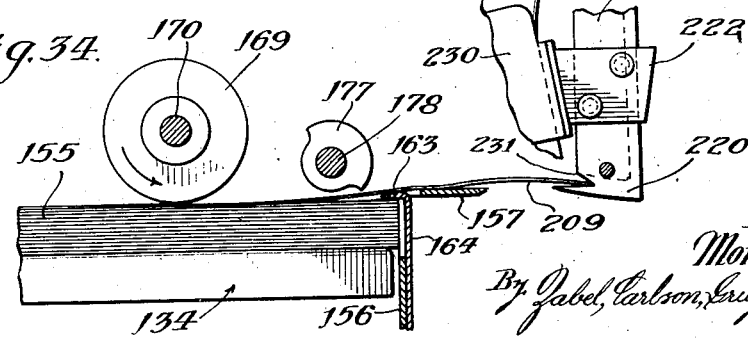

Patented Oct. 28, 1941

2,260,330

UNITED STATES PATENT OFFICE 2,260,330

DUPLICATING APPARATUS

Morris P. Neal, Villa Park, Ill., assignor to Ditto, Incorporated, Chicago, Ill., a corporation of West Virginia Application April 7, 1939, Serial No. 266,518

16 Claims. (Cl. 271—22)

My invention relates to duplicating apparatus and particularly to an improved form of blackprint duplicating apparatus employing a master sheet in the form of a thin sheet of aluminum or the like upon which a suitable ink repellent may be spread for controlling the effective application of ink to the sheet. My present improvements are not however to be restricted to use in connection with this type of machine, so far as they are applicable to other types of machines.

My invention relates among other things to improved means for feeding copy sheets one at a time from a pile of sheets so as to insure with a high degree of accuracy the delivery of a sheet upon each operative movement of the parts and so as to prevent the delivery of more than a single sheet at a time. For attaining these results, I have provided an improved form of supporting means for the copy sheets together with an improved arrangement of cooperating rollers for buckling the top sheet and feeding it forwardly in timed relation.

I have worked out my improved control of the copy sheets by the provision of a mutilated roller which is rotated in one direction upon each revolution of the drum upon which the master sheet is mounted for buckling the top sheet of the pile of copy sheets upwardly for drawing the forward edge of said sheet backwardly so as to pull such top sheet out of engagement with a backwardly extending finger, the mutilated roller being then rotated in the opposite direction for causing the sheet to be straightened out on top of the finger, after which an intermittently driven cylindrical roller in engagement with the sheet causes it to be moved forwardly in timed relation. In the construction illustrated, the mutilated roller serves also by its rotation in contact with the pile of copy sheets to give the pile the required downward movement against the action of a spring and to control the subsequent upward movement of the pile by the spring for bringing about the stripping action by which the top sheet is separated from the pile.

It is another object of my invention to provide improved means for controlling the operation of the machine so as to enable the operator easily and quickly to stop the movement of the copy sheets through the mechanism without stopping the rotation of the drum and easily and quickly to reestablish the regular sequence of printing operations when desired. In my improved arrangement, I have provided a hand lever by a stroke of which the impression roller and the inking mechanism are moved out of normal operative engagement with the drum, and the sheet feeding means is silenced. My novel arrangement is such that an upward intermediate buckling of the top copy sheet is effected upon the downward stroke of the hand lever by which the effective operation of the machine is stopped, such top sheet being held continuously in this buckled condition while the hand lever remains down. When the hand lever is brought again up to its raised position for renewing the operation of the machine, the impression roller and the inking mechanism are brought back into operative relation to the drum and the buckled top sheet is caused to straighten out on top of the stripping finger ready to be advanced upon the next successive actuation of the usual sheet forwarding means.

It is another object of my invention to improve mechanisms of this type in sundry details hereinafter pointed out. The preferred means by which I have accomplished my several objects are illustrated in the accompanying drawings, in which—

Fig. 3 is a transverse vertical sectional view taken substantially at the line 3—3 of Fig. 2;

Fig. 4 is a vertical sectional view showing the arrangement of latching means for holding down a hand lever by which some of the mechanisms of the machine are thrown out of operation, being taken substantially at the line 4—4 of Fig. 6;

Fig. 5 is a vertical sectional view taken substantially at the line 5—5 of Fig. 2, with the ink fountain unit removed;

Fig. 5a is a horizontal sectional view taken substantially at the line 5a—5a of Fig. 5, with the central portion broken away for clearness of illustration;

Fig. 6 is a horizontal sectional view taken substantially at the line 6—6 of Fig. 2 with certain of the parts omitted;

Fig. 7 is a vertical sectional view taken substantially at the line 7—7 of Fig. 5;

Fig. 8 is a view similar to Fig. 7 but with some of the parts omitted, and showing a changed position of some of the parts;

Figure 1:
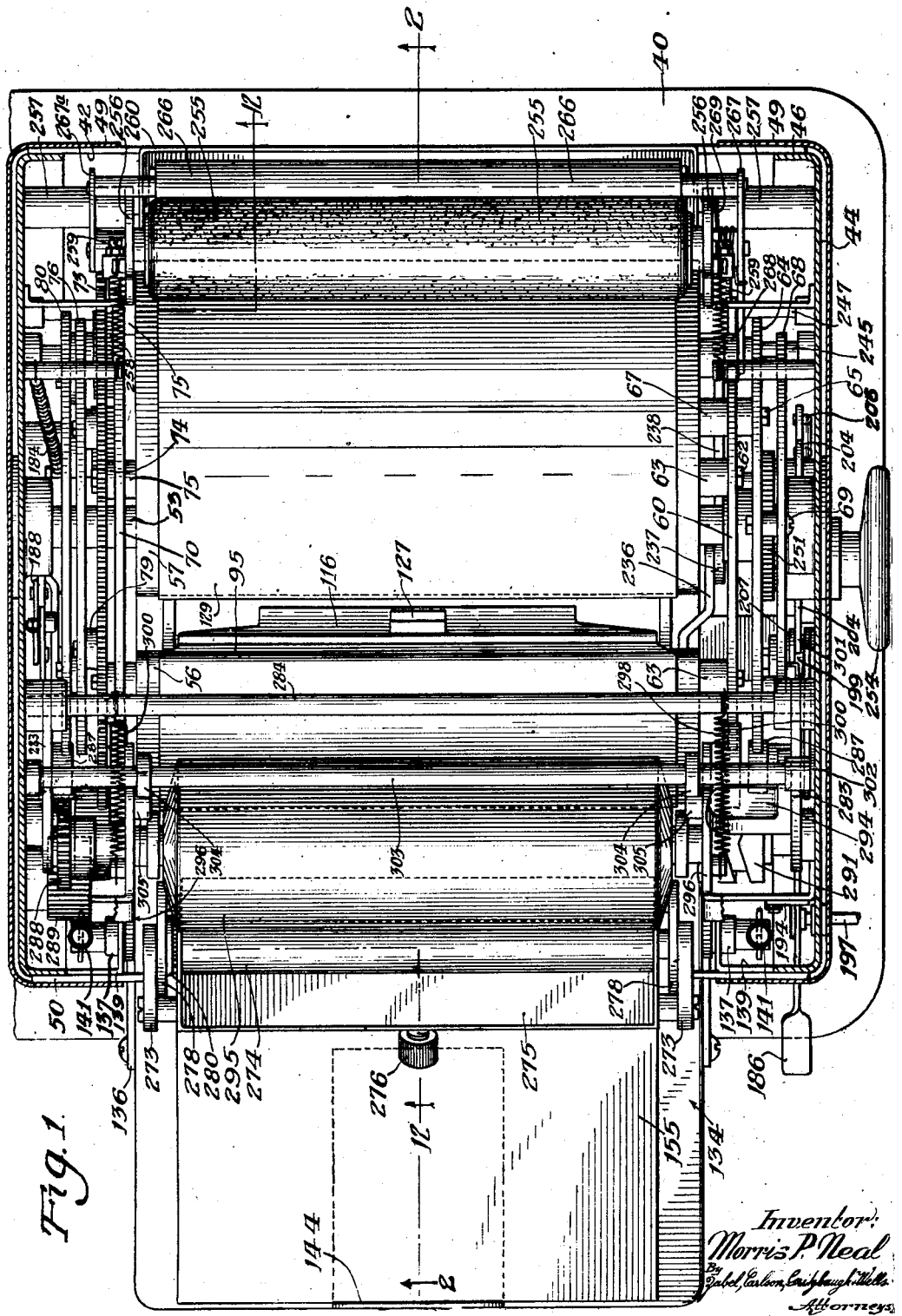
Fig. 1 is a top plan view of my improved machine but with the top face portion of the housing means broken away at each side of the machine.
Figure 2:
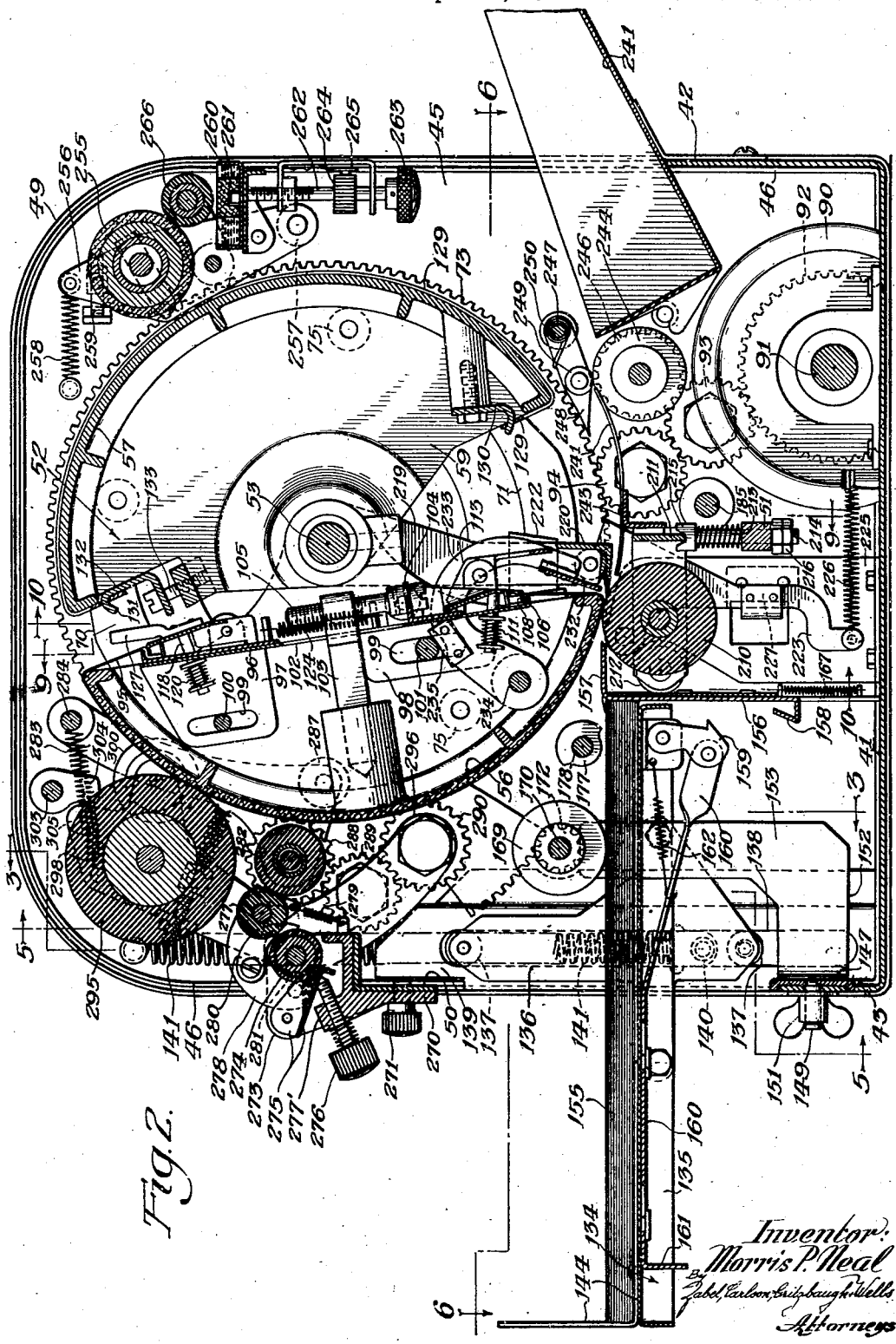
Fig. 2 is a central vertical sectional view of the upper portion of my improved machine being taken substantially at the line 2—2 of Fig. 1.
Figure 11:
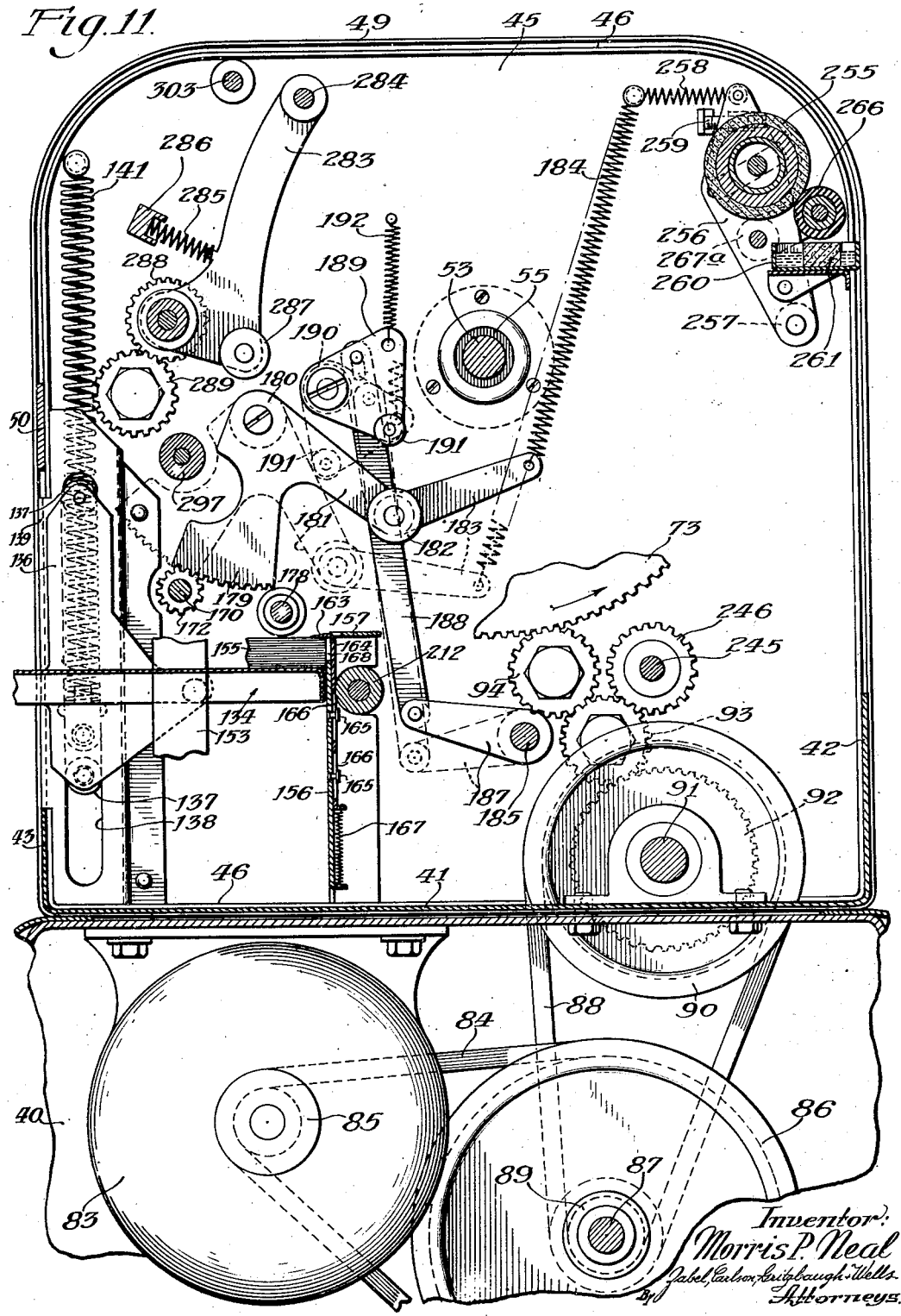

Figs. 9 and 10 are vertical sectional views taken substantially at the line 9—9 and the line 10—10, respectively, of Fig. 2;

Fig. 11 is a vertical sectional view taken substantially at the line 11—11 of Fig. 6 and showing by dotted lines changed positions of certain of the parts;

Fig. 12 is a vertical sectional view taken substantially at the line 12—12 of Fig. 1 but with some of the parts removed, such section line 12—12 being located outside of the main gear of the machine at the middle portion of the figure;

Fig. 13 is a view similar to a portion of Fig. 12 but showing a changed position of the parts;

Fig. 14 is a horizontal sectional view taken substantially at the line 14—14 of Fig. 5;

Fig. 15 is a vertical sectional view taken substantially at the line 15—15 of Fig. 14;

Fig. 16 is a vertical sectional view taken substantially at the line 16—16 of Fig. 9;

Figs. 17 and 18 are views similar to Fig. 16 but showing changed positions of the parts;

Fig. 19 is a vertical sectional view on an enlarged scale through a portion of my improved paper stop means carried by the drum, with the parts in substantially the same position as that shown in Fig. 16;

Fig. 20 is a central sectional view through my improved drum, being substantially a section taken at the line 20—20 of Fig. 21;

Fig. 21 is an end view of the drum, with certain of the parts shown in vertical cross-section as shown at the line 21—21 of Fig. 9, showing by dotted lines a changed position of the copy sheet stripping mechanism;

Fig. 22 is an inside face view of the section of the drum upon which the master sheet is secured, the mounting arms for said portion of the drum being shown in section and some of the operating parts being omitted for clearness of illustration;

Figs. 23, 24 and 25 are sectional views taken substantially at the line 23—23, the line 24—24, and the line 25—25, respectively, of Fig. 22;

Fig. 26 is a view similar to Fig. 25 but showing a changed position of the parts;

Fig. 27 is a vertical sectional view taken substantially at the line 27—27 of Fig. 5;

Fig. 28 is a detailed view showing the arrangement of the means for giving one of the inking rollers a longitudinal reciprocating movement;

Fig. 29 is a face view of the operating cam of the apparatus shown in Fig. 28, substantially as seen at the line 29—29 of Fig. 28;

Fig. 30 is a view similar to a portion of Fig. 27 but showing a changed position of the parts;

Figs. 31, 32, 33 and 34 are diagrammatic views showing successive positions of the parts for the feed of a sheet of paper from the pile of copy sheets;

Fig. 35 is a detailed view taken substantially at the line 35—35 of Fig. 22 but with the master sheet held by the operator in changed position in the course of adjusting it to the desired position; and Fig. 36 is a detailed view of a fragmentary portion of the drum and master sheet substantially as seen at the line 36—36 in Fig. 35.

Referring now to the several figures of the drawings, in which corresponding parts are indicated by the same reference characters, 40 indicates a cabinet of any approved type (see Fig. 11) upon which the frame of my improved machine rests. In the arrangement shown, the framework is in the form of a housing, comprising a sheet metal bottom plate 41 having an upturned flange 42 at the front and an upturned flange 43 at the rear. Upon the side edge portions of said bottom plate 41, I have provided sheet metal standards or side plates 44 and 45, each provided with a flange 46 extending thereabout in substantially right-angular relation. In spaced position with respect to the side plates 44 and 45, there are removable panels 47 and 48, also formed of sheet metal, and having flanges 49 thereabout. The standards or side plates are rigidly connected together by means of a heavy crossbar 50 at the rear face of the machine (at the left in Fig. 2) by a crossbar 51 (see Figs. 2 and 6) positioned directly beneath the drum and by a considerable number of operating parts as hereinafter set forth.

Between the standards 44 and 45, I have mounted a drum structure 52 by means of a heavy shaft 53 which is supported between the standards by means of anti-friction bearing devices 54 and 55, as is clearly shown in Fig. 9. As is clearly shown in Fig. 2 and in various other figures, the drum 52 is formed in two sections 56 and 57, said two sections being mounted in fixed position with respect to each other through the medium of end plates 58 and 59 respectively (see Figs. 20 and 21). As is clearly shown in Fig. 20, the end plates 59 of the section 57 are offset inwardly so as to fit between the arms or end plates 58 of the section 56.

As is clearly shown in Fig. 10, the drum 52 is provided with a plurality of cams and other mechanism at its opposite ends. At the near side of the machine (at the right in Fig. 10), I have provided two cams 60 and 61 mounted in bridging position between the two sections 56 and 57 of the drum, said two cams being arranged in the same plane with each other and having their end portions in spaced relation to each other at opposite sides of the drum, as is clearly shown in Fig. 7. In the arrangement shown, the cams 60 and 61 are mounted in position by means of machine screws 62 passing through the cams and secured by means of screw-threads in lugs 63 carried by the drum. In outwardly spaced relation to the cams 60 and 61, I have provided a cam 64 in the form of a ring which is adjustably mounted in position by means of machine screws 65 passing through circumferential slots 66 in the cam into lugs 67 carried by the drum. In spaced relation to the cam 64, in turn, I have provided a second cam 68 in the form of a ring secured to the outer face of the cam 64 by means of bolts 69.

At the opposite end of the drum, I have provided cams 70 and 71 which are similar in size and shape to the cams 60 and 61 respectively, such cams being secured in position by means of machine screws 72 which secure a ring gear 73 in position upon the drum. In the arrangement shown, the gear is provided with spacing bosses 74 for holding the gear 73 in spaced relation to the cams 70 and 71, the screws 72 being mounted at their inner ends in lugs 75 carried by the drum. Upon the outer face of the gear 73, I have mounted a cam 76 in the form of a ring corresponding to the cam 64, such cam 76 being mounted in position by means of machine screws 77 extending through slots 78 in the cam and through spacing sleeves 79 into engagement with threaded openings in said gear 73. Upon the outer face of the cam 76, I have mounted a cam 80, also in the form of a ring, secured in position by machine screws 81 extending into threaded openings in the cam 76, spacing sleeves 82 being provided between said two cams.

The means for driving the drum 52 comprises in the arrangement shown an electric motor 83 mounted in the cabinet 40 (see Fig. 11), such motor being connected by means of a belt 84 and pulleys 85 and 86 with a shaft 87 which in turn is connected by a belt 88 and pulleys 89 and 90 with a shaft 91 which is provided with a gear 92 fixedly mounted thereon. As is clearly shown in Fig. 11, the gear 92 meshes with a rotatably mounted pinion 93 which in turn drives a pinion 94 meshing with the gear 73 carried by the drum. The arrangement is such that during the time when the motor 83 is in operation the shaft 53 carrying the drum sections and the parts connected thereto is driven continuously.

As is perhaps best shown in Fig. 21, the drum section 56 is of greater diametrical size than the section 57 for reasons as will appear hereinafter. Upon the drum section 56 of greater diameter, I have provided means for mounting a master sheet 95 with its intermediate portion wrapped about the face of the drum section. For making the master sheet adjustable circumferentially with respect to the drum section, I have connected the opposite ends of the master sheet with a plate 96 which extends across the drum and is adjustable edgewise with respect thereto. For adjustably mounting the plate 96 in position, I have provided brackets 97 and 98 thereon having slots 99 therein which are slidable upon shafts or bars 100 and 101 carried by the drum section 56 longitudinally thereof, as is best shown in Figs. 2 and 23. At about its middle point, the plate 96 is provided with an opening 102 through which a lug 103 extends, such lug being mounted upon the inner face of the wall of said drum section 56. Upon the face of the plate 96, at the right in Fig. 2, I have provided a bracket 104 in which an adjusting screw 105 is rotatably mounted, such adjusting screw 105 having screw-threaded connection with the lug 103 for holding the plate 96 in adjusted position with respect to the drum section.

At the lower edge of the plate 96 in the position of the parts as shown in Fig. 23, I have provided a flange 106 extending at an angle with respect to the body of the plate. Upon the face of the plate above the flange 106, I have pivotally mounted a small plate 107 which is provided at its free edge with a flange 108 in position to cooperate with the flange 106 for gripping one end portion of the master sheet 95. In the arrangement shown, the plate 107 is provided with a plurality of pins 109 extending through slots 110 in the plate 96, said pins having coiled springs 111 mounted thereon in position normally to hold the plate 107 moved to the limit of its motion in clockwise direction in said Fig. 23 so as to hold the flanges 106 and 108 in effective gripping position with respect to each other. In the arrangement shown, the plate 96 is provided with lugs 112 at right angles to its face for limiting the movement of the master sheet 95 into gripping position between the flanges 106 and 108. In the arrangement shown, the plate 107 is also provided with a pivotally mounted lever or bracket 113 which stands normally in the position as shown in Fig. 23 but which is capable of being swung in counterclockwise direction in Fig. 23 into a changed past-center position in which it is effective for holding the plate 107 swung toward the right in Fig. 23 for permitting ready insertion of a master sheet between the flanges 106 and 108.

At the opposite edge of the plate 96, at the top of the plate in the position in which the parts are shown in Fig. 23, I have provided a second flange 114 corresponding to the flange 106, such flange 114 however being mounted upon an auxiliary plate 115 slidably mounted upon the plate 96. The auxiliary plate 115 is provided with a narrow plate 116 pivotally mounted thereon corresponding substantially to the plate 107 of the mechanism just described, such plate 116 being provided at its free edge with a flange 117 adapted to cooperate with the flange 114 for gripping the end of the master sheet 95. The plate 116 is provided with a plurality of pins 118 extending through slots 119 in the plate 96 and the auxiliary plate 115, springs 120 being provided on said pins for holding the plate 116 and its flange 117 normally in gripping relation to the flange 114. The plate 115 is also provided with stop lugs 121 corresponding to the lugs 112 of the arrangement at the opposite edge of the plate 96 for limiting the movement of the master sheet into position to be gripped. In the arrangement shown, the plate 115 is slidably mounted in position on the plate 96 by means of headed pins or rivets 122 carried by the plate 115 and working in slots 123 in the plate 96, as is clearly shown in Figs. 22 and 24. The plate 115 at one edge of the plate 96 is normally urged toward the opposite edge of said plate 96 by means of coiled springs 124, as is best shown by Fig. 23.

In the arrangement shown in the drawings, the plate 116 is pivotally mounted in position by means of flanges 125 formed integrally with the plate at its opposite ends, said flanges being provided with large lugs 126 thereon, as is best shown in Fig. 26. In the position of the parts as illustrated in Figs. 22-25, the plate 116 is held against swinging movement on its pivotal axis by the engagement of the lugs 126 with the face of the plate 96. When it is desired that the plate 116 be swung outwardly away from the plate 96 into the position as shown in Fig. 26, the plate 116 is first moved edgewise toward the adjacent edge of the plate 96 against the action of the springs 124, this movement being effected by a pull on a handle 127 on said plate 116. This movement of the plate 116 serves to bring the lugs 126 into register with slots 128 in the plate 96 so as to permit said plate to be swung in clockwise direction in said Fig. 26. When the lugs 126 have been carried completely through the slots 128, the pull on the handle 127 is relaxed for permitting the springs 124 to draw the plate 116 to the position as shown in said Fig. 26, in which position the lugs 126 serve to prevent return movement of the plate 116 by the springs 120.

In the arrangement shown in my drawings, the master sheet 95 is in the form of a thin flexible sheet of metal, preferably aluminum, having had its operative face subjected to a sand blasting operation for causing an ink repellent when applied thereto to spread evenly over its surface. When a master sheet of this type is to be mounted upon the drum, the parts are first brought to the position as shown in Fig. 26, whereupon one end portion of the master sheet is inserted between the flanges 114 and 117 into even engagement with the stops 121. The plate 116 is then manipulated for freeing the large lugs 126 from the slots 128 of the plate 96 so as to permit the springs 120 to move the plate 116 into position to grip the end of the master sheet as shown in Fig. 23. After the end of the sheet 95 has been secured in position, the sheet is extended substantially horizontally above the drum portion 56 by the operator, who then manipulates the set screw 105 by a suitable tool for bringing the graduations on the master sheet into the desired position with respect to the graduations on the drum section 56, as shown in Fig. 36. The master sheet is then wrapped smoothly about the drum section 56 and its leading end is inserted between the flanges 106 and 108, whereupon the plate 107 is moved into clamping engagement with the master sheet. The arrangement is such that the springs 124 serve effectively for holding the master sheet taut about the section of the drum.

Upon the section 57 of the drum, I have provided a blanket or ink pad 129, one end of which is held in position by means of hooks 130, as is clearly shown in Fig. 2, the opposite end of the blanket being mounted upon hooks 131 carried by a plate 132 adjustably mounted in position by means of machine screws 133, the intermediate portion of the blanket being wrapped about the face of the drum section 57. The machine screws 133 are to be tightened for holding the blanket 129 smoothly and snugly in position, as will be readily understood.

The means for holding copy sheets in position to be fed into the machine and for feeding sheets one at a time from a pile of the sheets comprises a table 134 which is movably mounted on the framework of the machine. In the arrangement shown, the table is in the form of a panel of sheet metal provided with a flange 135, such flange being preferably formed integral with the body portion of the panel. At opposite sides, the panel 134 is provided with vertically disposed arms 136 which are secured in position upon the side flange portions of the panel so as to extend both upwardly and downwardly from the top face of the panel. At the upper and lower end portions of the arms 136, I have provided rollers 137 rotatably mounted in position so as to engage vertical slots 138 in frame members 139 at opposite sides of the machine. In the arrangement shown, the frame members 139 are in the form of housings bent into shape out of sheet metal and fitting in the corners of the main housing of the machine, as is clearly shown in Fig. 6. Near the lower ends, the vertically disposed arms 136 are provided with pins 140 to which are connected long coiled springs 141 whose upper end portions are connected with pins 142 extending inwardly from the standard members 44 and 45, as is best shown in Fig. 3. The arrangement is such that the springs 141 normally hold the table 134 moved upwardly to the limit of its motion as controlled by the rollers 137 in the slots 138, or as controlled otherwise as hereinafter described. As is best shown in Fig. 3, guide rollers 143 are provided, being rotatably mounted upon horizontal axes at opposite sides of the machine so as to engage the vertically disposed arms 136 for limiting the sidewise movement of the table 134, such rollers 143 being rotatably mounted in position upon the frame members 139 in the arrangement shown.

Upon the rear edge portion of the table 134, I have provided a margin bar 144 which, in the arrangement shown, is in the form of an angle, the lower horizontally extending arm portion of which is provided with a slot 145 so as to be adjustably held in position upon the table by means of a headed pin or rivet 146, as is clearly shown in Fig. 6.

Transverse margin bars are provided for controlling the position of a pile of sheets on the table 134, such margin bars being mounted upon the main frame of the machine. As is best shown in Figs. 2 and 3, each of these side margin bars comprises a sheet metal plate 147 which is slidably mounted upon the top edge portion of the end flange 43 of the bottom plate 41 of the main housing. For enabling the plates 147 to be readily mounted in position, I have provided a slot 148 in the flange 43, the plates 147 having lugs turned at an angle for engaging the top portion of the flange as defined by said slot. The plates 147 are also provided with screw threaded pins 149 rigidly secured thereon so as to extend through slots 150 in said flange 43. Wing nuts 151 are provided on the ends of the pins 149 for locking the plates 147 in adjusted position transversely of the machine. Upon the outer ends of the plates 147, I have provided forwardly extending arms 152 preferably formed integrally with the plates 147, such arms 152 in turn being provided at their forward end portions with upwardly extending arms 153, as is clearly shown in said Fig. 2. The upper end portions of the arms 153 extend upwardly through slots 154 in the panel 134, as is clearly shown in Fig. 6, so as to engage the side edges of a pile 155 of copy sheets in position on the table, as shown in Fig. 3.

Opposite the forward edge of the table 134, I have provided a transverse frame bar 156 in the form of a sheet metal plate in vertical position, having its top edge portion bent forwardly in the form of a flange 157. At an intermediate point on said plate 156, I have provided a backwardly projecting lug 158 which is preferably struck out from the body of the sheet. Upon the bottom face of the panel 134, as is clearly shown in Figs. 2 and 5, I have provided a latch member 159 pivotally mounted in position to engage the lug 158 for holding the table 134 releasably in lowered position. As is shown in Fig. 2, the latch member 159 is pivotally connected at its lower end portion with a link 160 which at its rear end portion is slidably mounted upon the body of the panel 134, being provided with a downwardly turned handle portion 161 on its rear end. At an intermediate point, the link 160 is connected by means of a coiled spring 162 with the table 134 so as to hold the latch 159 normally swung to the limit of its motion toward the front. The arrangement is such that when the table 134 is moved downwardly through a substantial distance the latch 159 automatically engages the lug 158 so as to hold the table against a return upward movement by the springs 141. When it is desired thereafter to move the table upwardly, the link 160 is moved backwardly by pressure upon the handle 161 so as to release the latch 159 from the lug 158.

Above the table 134, I have provided sheet feeding means which serves both to feed sheets forward from the pile 155 and also to limit the upward movement of the table 134, as hereinafter described. In connection with such sheet feeding means, I have provided a plurality of vertically movable fingers 163 which are mounted upon the cross bar 156 so as to extend over the pile of sheets 155 on the table. In the arrangement shown, each of the fingers 163 is mounted upon the upper end of a plate 164 which is slidably mounted upon the front face of the cross plate 156. In the arrangement shown, the plates 164 are mounted in position upon the plate 156 by means of headed pins or rivets 165 extending through slots 166 in the plate 164. The lower end of the plate 164 is connected by a spring 167 with the lower edge portion of the plate 156 so as to urge the plate 164 and the finger 163 yieldingly downward. The fingers 163 in turn extend through slots 168 in the upper edge portion of the plate 156.

The means for feeding the copy sheets one at a time from the pile 155 to the drum 52 comprises a pair of rollers 169 fixedly mounted upon a transversely extending shaft 170. As is best shown in Fig. 14, the shaft 170 is provided with a free wheeling clutch device 171 mounted thereon for connecting a pinion 172 into driving relation with the shaft. In the construction illustrated, the clutch arrangement comprises a sleeve 173 by which the pinion 172 is carried, such sleeve being rigidly connected with a recessed plate 174 operating within a housing 175 adapted to rotate with the shaft. As is best shown in Fig. 15, there are spring pressed balls 176 mounted in openings between the plate 174 and the housing 175, arranged so as to drive the housing 175 and the shaft 170 by power applied in counter-clockwise direction to the plate in said Fig. 15. The arrangement shown further is such that when the plate 174 is driven in clockwise direction in Fig. 15, the plate is permitted to rotate without applying power to the housing or the shaft.

The arrangement is such that the pile of sheets is pressed upwardly against the forwarding rollers 169 so that such rollers limit the upward movement of the supporting table.

A short distance in front of the rollers 169, I have provided a multilated roller 177 rotatably mounted in position across the table by means of a shaft 178. The shape of the roller and the position in which it is mounted are such (see Fig. 2) that the roller normally stands out of engagement with the top sheet of the pile of sheets carried by the table, but are such that when the roller is given a rotary movement in clockwise direction in Fig. 2 from the position there shown, the roller is brought into engagement with the uppermost sheet of the pile 155. As the rotation of the multilated roller 177 continues in clockwise direction in Fig. 2, after being brought into engagement with the top sheet of the pile, the pile of sheets and the table 134 are moved downwardly by the roller 177 against the action of the springs 141 so as to carry the top sheet out of engagement with the rollers 169.

The means for driving the rollers 169 through the pinion 172 comprises a toothed segment 179 pivotally mounted upon a lug 180 carried by the standard 45 (see Fig. 6) at the far side of the machine. The segment 179 is provided with an arm 181 formed integrally therewith, the arm 181 being provided with a roller 182 in position to engage the cam 80 for swinging the segment 179 so as to drive the pinion 172 as the drum rotates. At its end portion, the arm 181 is provided with an extension in the form of an arm 183 which is connected by means of a spring 184 with the standard 45 near the front end of the standard, as is clearly shown in Fig. 12. The arrangement is such that upon rotary movement of the drum in counter-clockwise direction in said Fig. 12, the cam 80 forces the arm 181 outwardly at intervals against the action of the spring 184 for driving the pinion 172 in counter-clockwise direction in said Fig. 12. Upon continued rotation of the drum, the spring 184 swings the arm 181 and the segment 179 in reverse direction for giving the pinion 172 rotary movement in clockwise direction in said Fig. 12.

Means is provided for preventing rotation of the pinion 172 and the shaft 170 carrying the rollers 169 while still permitting rotation of the drum. This means comprises a shaft 185 extending across the machine below the drum 52, having a lever 186 fixedly mounted thereon, such lever extending backwardly through the housing parts so as to extend a short distance outside of the housing, as is clearly shown in Figs. 6 and 7. At the far side of the machine, the shaft 185 is provided with an arm 187 (see Fig. 11) to which a link 188 is pivotally connected at its lower end, the upper end portion of said link being pivotally connected to a triangular plate 189 which is pivotally mounted upon a lug 190 carried by the standard 45, as is clearly shown in Figs. 6 and 11. The plate 189 is provided with a roller 191 in position to engage the arm 181, as is clearly shown in Fig. 11, for moving the segment 179 in clockwise direction in Fig. 11. A spring 192 connected at its lower end to the triangular plate 189 and connected at its upper end to the standard 45 serves normally to hold the plate 189 in its uppermost position with the roller 191 out of engagement with the arm 181. The arrangement is such that when the lever 186 is moved downwardly from the position as shown in Fig. 7, the shaft 185 is rocked in counterclockwise direction in said figure for lowering the arm 187 from the position as shown in solid lines in Fig. 11 to the position as shown in dotted lines in said figure, serving through the link 188 to carry the triangular plate 189 correspondingly downward against the action of the spring 192. This downward movement of the plate 189 and the roller 191 serves by engagement with the arm 181 to move said arm 181 toward the left in Fig. 11, so as to cause the segment 179 to rotate the pinion 172 in counter-clockwise direction in said Fig. 11.

In the arrangement shown, the lever 186 is connected at its extreme forward end by a coiled spring 193 with the framework below the lever serving normally to hold the lever in the position as shown in Fig. 7. Latching means is provided for holding the lever 186 releasably in the position as shown in Fig. 8. In the arrangement shown, this latching means comprises a plate 194 pivotally mounted upon the wall of the frame member 139, as is best shown in Figs. 4 and 6, a spring 195 being provided adapted normally to hold the plate swung to the limit of its movement in clockwise direction in Fig. 4. The arrangement is such that the lever 186 normally stands above the position of the latch plate 194, being adapted to displace the latch member against the action of the spring 195 when the lever 186 is moved downwardly. As is clearly shown in Fig. 4, the plate 194 is provided with a horizontally disposed shoulder 196 in position to snap into holding engagement with the lever 186 when the lever is depressed to the position as shown in Figs. 4 and 7. For moving the latch plate 194 out of operative engagement with the lever 186, I have provided a headed push pin 197 slidably mounted in the standard 44 opposite said plate 194. When the pin 197 is pushed toward the right in Fig. 4 from the position shown in solid lines to the position shown in dotted lines, the latch plate 194 is moved out of holding engagement with the lever 186.

The means for rotating the mutilated roller 177 in timed relation to the movement of the cooperating parts comprises a toothed segment 198 pivotally mounted upon a lug 199 carried by the standard 44, as is clearly shown in Fig. 6, such segment meshing with a pinion 200 fixedly mounted upon the shaft 178, as is shown in Figs. 6 and 7. The segment 198 is provided with an arm 201 formed integrally therewith carrying at its upper end a roller 202 in position to engage the cam 68. In the construction illustrated, I have provided a spring 203 acting upon the arm 201 for holding the roller 202 in operative engagement with the cam 68. The arrangement is such that upon rotation of the drum in counter-clockwise direction in Fig. 27 the roller 202 is moved outwardly at intervals against the action of the spring 203 for causing the sector 198 to actuate the pinion 200 and the shaft 178 carrying the mutilated roller 177, the spring 203 serving to cause a reverse movement of the parts when the high portion of the cam 68 has passed the roller 202.

Means is provided in connection with the arm 201 for moving the roller 202 out of engagement with the cam 68 when desired. This means comprises, in the arrangement shown, a bell crank lever 204 (see Figs. 6 and 7) pivotally mounted upon a lug 205 projecting from the inner face of the standard 44, such lever being connected at one arm portion with the lever 186 by means of a link 206 and being provided at its other arm portion with a roller 207 in position to engage a bracket 208 carried by the arm 201 in spaced relation thereto at one face of the arm. The arrangement is such that when the lever 186 stands in the position as shown in Fig. 7, the roller 207 is held out of operative engagement with the bracket 208. When, however, the lever 186 is moved downwardly into the position as shown in Fig. 8, the bell crank lever 204 is moved in counter-clockwise direction from the position shown in Fig. 7 to the position shown in Fig. 8, in which position the roller 207 by engagement with the bracket 208 holds the roller 202 out of engagement with the cam 68.

With the parts in the position as shown in Fig. 7, when the drum is rotated in counter-clockwise direction therein, the shaft 178 is first rotated in clockwise direction in said figure for bringing the mutilated roller 177 into engagement with the top sheet of the pile 155. The rotation of the roller 177 in clockwise direction by the cam 68 is sufficient for moving the table 134 and the pile of copy sheets 155 downwardly out of engagement with the rollers 169 and for forcing the forward edge of the uppermost copy sheet backwardly so as to buckle the intermediate portion of such top copy sheet upwardly into some such position as that shown in Fig. 32. This movement of the copy sheet serves to draw the forward edge of the sheet out of position underneath the fingers 163, whereupon the fingers are drawn downwardly by the springs 167 so as to engage the next lower copy sheet. The arrangement of the cam 68 is such that promptly following the intermediate buckling of the sheet the toothed segment 198 is caused to swing in the opposite direction for causing the mutilated roller 177 to turn in counter-clockwise direction into the position as shown in Fig. 33, the uppermost copy sheet 209 being straightened out by its own resiliency into position above the fingers 163 as shown in said Fig. 33. The arrangement further is such that promptly following the effective counter-clockwise rotation of the mutilated roller 177 into the position as shown in Fig. 33, the rollers 169 are given rotary movement also in counter-clockwise direction for carrying the sheet 209 forwardly into engagement with stop means hereinafter described.

The lever 186 is provided for throwing certain of the parts out of operation while permitting the rotation of the drum to continue unbroken. The arrangement in my improved machine is such, as hereinafter set forth, that when the lever is moved downwardly the feeding rollers 169 and 177 are silenced and that the impression roller of the machine is moved out of position for engaging the drum and that the form roller of the inking mechanism is moved out of position for engaging the form. The arrangement is such that the lever 186 can be moved downwardly at any time after a copy sheet has cleared the printing position and before the cam 68 has actuated the toothed segment 198 for starting the delivery of the next following copy sheet. My arrangement is such that the period during which the lever 186 may be pushed downwardly without interfering with the proper operation of the machine comprises about two-thirds of the period of a complete revolution of the drum.

When the lever 186 is pushed downwardly for throwing the sheet feeding mechanism out of operation, on the downward stroke of said lever 186 the mutilated roller 177 is given an operative rotary movement in clockwise direction in Fig. 32 independently of the cam 68 for withdrawing the top sheet from the fingers 163 so as to buckle the intermediate portion of the sheet upwardly. At the same time, the rollers 169 are rotated in counter-clockwise direction in said figure through the medium of the roller 191 and its cooperating parts and independently of the cam 80, but such rotation of the rollers 169 has no effect upon the top sheet of the pile, since the mutilated roller 177 acts in advance of the start of the drive of the rollers 169 so as to move the pile downwardly out of engagement with said rollers 169. As a result of this arrangement, the top sheet is held continuously in the position as shown in Fig. 32 during the time when the lever 186 is being held down. When the lever 186 is moved upwardly by the spring 183 for renewing the normal operation of the machine, the mutilated roller 177 is given a counter-clockwise rotary movement for bringing the parts into the position as shown in Fig. 33, with a sheet in position above the fingers 163. Upon the next succeeding rotary movement of the rollers 169 in counter-clockwise direction in said Fig. 33 through the medium of the cam 80 as above described, the top sheet is forwarded to the drum in the usual manner.

For insuring that the rollers 169 shall not start their rotary movement in counter-clockwise direction in Fig. 31 until after the mutilated roller 177 has pushed the pile of sheets downwardly upon a downward stroke of the lever 186, I have provided a lost motion between the roller 191 of the plate 190 and the arm 181 by which the toothed factor 179 does not become effective for rotating the rollers 169 until after the mutilated roller 177 has acted to carry the pile 155 of copy sheets out of engagement with the rollers 169.

At a short distance in advance of the mutilated roller 177, I have mounted an impression roller 210 so as to move toward and away from the drum 52. In the arrangement shown, the impression roller 210 is rotatably mounted in a heavy metal yoke 211, the arms of which are pivotally mounted upon lugs 212 extending inwardly from the inner faces of the standards 44 and 45, as is clearly shown in Fig. 6. The impression roller 210 is normally pressed upwardly into operative engagement with the drum 52 by means of springs 213 mounted upon bolts or pins 214 extending loosely through the frame bar 51 as is clearly shown in Fig. 16. The pins 214 are provided with heads 215 on their upper ends which are notched to receive the cross bar portion of the yoke 211. The pins 214 are provided on their lower end portions with nuts 216 for limiting the upward movement of the pins with respect to the frame bar 51. The arrangement is such that the springs 213 normally hold the impression roller 210 in position to operatively engage the drum section 56 and the master sheet carried thereby.

Means is provided serving to move the impression roller 210 downwardly upon a downward stroke of the lever 186. This means comprises pins 217 carried by the shaft 185 (see Fig. 6), such pins engaging openings through brackets 218 carried by the cross bar portion of the yoke 211. Upon rotary movement of the shaft 185 in counter-clockwise direction in Fig. 2, the yoke 211 and the impression roller 210 carried thereby are moved downwardly so as to hold the impression roller in spaced relation to the drum. For limiting the upward movement of the impression roller 210 so as to prevent it from being carried into engagement with the ink pad 129 carried by the smaller drum section 57, I have provided a link 210a pivotally connected with the yoke 211 (see Fig. 9), the link 210a extending through an opening in the frame bar 51 and having nuts 210b secured adjustably in position by means of screw-threads on its lower end portion.

In the arrangement shown, the effective force of the springs 213 for pressing the impression roller 210 against the drum can be regulated by an adjustment of the nuts 216, as will be readily appreciated.

My improved stop means for engagement with the front edge of a copy sheet so as to limit the forward movement of the sheet under the influence of the rollers 169 comprises two arms 219 at opposite sides of the machine, such arms in the arrangement shown being pivotally mounted on the hubs of the arms 58 of the drum section 56. At their end portions, the arms 219 carry a cross bar 220 which, in the arrangement shown, is formed integrally with the adjacent portions of the arms 219, as is best shown in Fig. 19. As is best shown in Fig. 16, the arms 219 are connected by means of springs 221 with the end walls 59 of the drum section 57, such springs serving to hold the bar 220 normally in engagement with the radially disposed face portion of the drum section 57. For cushioning the arms 219 with respect to engagement with the drum section 57, I have provided a bumper member 222 preferably of rubber.

Immediately below the drum 52, I have provided latch members 223 pivotally mounted by means of rivets 224 upon brackets 225 at opposite sides of the machine. Each of the latch members 223 is provided with a spring 226 in connection therewith serving normally to hold the member swung to the limit of its movement in counter-clockwise direction in said Fig. 16, the motion of the latch device in counter-clockwise direction in said figure being limited by stop devices comprising bumpers 227 preferably of rubber. As is clearly shown in Fig. 16, the latch members 223 are provided at their upper ends with lugs 228 which normally extend into the paths of movement of rollers 229 carried by the cross bar 220, the rear faces of the lugs 228 being obliquely disposed as is clearly shown in said Fig. 16.

In the rotation of the drum in conter-clockwise direction in Fig. 18, the cross bar 220 stands normally in engagement with the drum section 57, in which position it travels about with the drum. When, however, the cross bar reaches the position as shown in Fig. 16, the rollers 229 are brought into engagement with the lugs 228 by which the forward movement of the cross bar 220 is stopped so as to permit the cross bar to remain stationary during the immediately following continued rotation of the drum. When, however, bumper plates 230 carried by the drum section 56 are brought into contact with the bumper member 222, so as to apply increased pressure for urging the cross bar 220 toward the right in said Figs. 16 and 17, the rollers 229, by a camming action upon the obliquely disposed faces of the lugs 228, force the latch members 223 to swing in clockwise direction in said figures against the action of the springs 226 for freeing the cross bar 220 from such latch members. As soon as the rollers 229 clear the lugs 228, the springs 221 serve immediately for carrying the parts again to the position as shown in Fig. 18.

As is clearly shown in Fig. 19, the cross bar 220 is provided with a groove 231 in its face in position to receive the forward edge of a copy sheet 209 as such sheet is moved forward by the rollers 169 over the impression roller 210. The shape and position of the cams 68 and 80 are such that the sheet 209 is moved forward into engagement with the notch 231 of the cross bar during the period when such cross bar is being held stationary by the latch members 223.

Means also is provided for pushing the front edge of a copy sheet outwardly away from the master sheet 95 at a very short distance in advance of the impression roller 210. This means, in the arrangement shown, comprises a cross bar 232 (see Fig. 16) mounted between inwardly bowed arms 233 which are mounted upon a shaft 234 rotatably mounted between the end plates 58 of the drum section 56. Each of said arms 233 is provided with a bumper block 235 preferably of rubber adapted by engagement with the stationary shaft or bar 101 to limit the movement of the arms in counter-clockwise direction in Fig. 16. The arrangement is such that the bar 232 normally stands in position closely adjacent to the leading edge of the master sheet 95 at the rear edge of the opening between the face portions of the drum sections 56 and 57. Upon one end of the shaft 234 (see Figs. 20 and 21) I have provided an arm 236 provided with a roller 237 on its outer end portion adapted to engage a stationary cam 238 upon each rotation of the drum for turning said shaft 234 in clockwise direction in Fig. 21 and moving the bar 232 into changed position, as shown in Fig. 18, so as to carry the leading edge portion of the copy sheet 209 outwardly with respect to the drum out of engagement with the master sheet 95. In the arrangement shown, the stationary cam 238 is mounted in position upon lugs 239 projecting inwardly from the standard 44, as is clearly shown in said Fig. 20. Upon the shaft 234 I have mounted a coiled spring 240 engaging the inner face of the wall of the drum at one end and one of the arms 233 at its opposite end, and holding the arms 233 normally in operative engagement with the shaft 101 so as to limit the inward movement of the bar 232. The arrangement of the parts is such that the bar 232 moves outwardly in close proximity to the front face of the impression roller 210 so as to strip the copy sheet from the master sheet promptly following the engagement of the sheet between the impression roller and the drum.

Guiding and forwarding means are provided below the drum 52 for insuring that the printed sheet 209 shall be delivered definitely to the receiving tray 241 of any suitable type mounted upon the framework in front of the drum. This means comprises a plurality of curved guide straps 242 extending forwardly from the impression roller 210, such straps 242, in the arrangement shown, being mounted upon an angle bar 243 carried by the cross bar portion of the yoke 211, as is clearly shown in Fig. 2. The straps 242 are substantially upon a level with rollers 244 which are fixedly mounted upon a shaft 245 so as to rotate with said shaft (see Figs. 2 and 6). In the arrangement shown, the shaft 245 is driven by a gear 246 meshing with the idler gear 93, as is clearly shown in Fig. 2. Above and slightly in advance of the shaft 245, I have provided another shaft 247 mounted between the standards 44 and 45 upon which I have mounted backwardly pointing guide bars 248 which are in upwardly spaced relation to the guide straps 242, as is clearly shown in Figs. 2 and 18. The guide bars 248 are in such position that the forwardly moving copy sheet 209 is received between the bars 248 and the straps 242 so as definitely to prevent a copy sheet from moving upwardly with the drum. For expediting the movement of the copy sheets between the bars 248 and the rollers 244, I have mounted knurled rollers 249 on said arms, such knurled rollers being driven by friction by the influence of the rollers 244 immediately below. For pressing the bars 248 and the knurled rollers 249 downwardly into operative position, I have provided coiled springs 250 upon the shaft 247, such springs bearing at their outer ends upon said arms 248. In the arrangement shown, the shaft 247 is held stationary, the inner ends of the springs 250 being held against rotary movement by engagement with the shaft.

In addition to the means for driving the drum 52 by power from the motor 83, I have provided means for turning the drum manually. This means comprises a gear 251 rigidly mounted on the shaft 53 of the drum adjacent to the standard 44 at the near side of the machine, such gear meshing with a pinion 252 carried by a short shaft 253 having a journal bearing in said standard. On its outer end, the shaft 253 is provided with a hand wheel 254 so as to enable the operator to turn said shaft and the drum as may be desired.

Means is provided for applying a film of water or other ink repellent upon the master sheet as it is carried around by the drum. Such means forms in and of itself no part of my present invention, and it will accordingly be described quite briefly.

In the arrangement shown, the ink repellent applying means comprises a roller 255 which in the arrangement shown has a facing portion of felt, such roller being mounted between two arms 256 which are pivotally mounted upon lugs 257 extending inwardly from the standards 44 and 45 (see Figs. 1 and 27). Springs 258 connected with the arms 256 and with adjacent portions of the framework normally urge the arms 256 toward the drum for holding the roller 255 in position to engage the master sheet 95 upon the drum section 56. Means comprising adjustable set screws 259 serve to limit the movement of the roller 255 toward the drum so as to prevent the roller being brought into contact with the blanket 129 upon the drum section 57 of smaller diameter.

Upon the framework of the machine in front of the drum 52 and below the roller 255, I have provided a receptacle 260 adapted to contain water or other suitable ink repellent, such receptacle being provided with a porous liquid absorbent member 261 which in the arrangement shown is in the form of a porous stone. This liquid absorbent member extends across the full length of the roller 255 in downwardly spaced relation thereto, being adjustable upwardly with respect to the roller 255 by means of adjusting screws 262 engaging the receptacle 260 at opposite end portions thereof. The adjusting screws 262 are provided with knurled head members 263 on their lower ends for rotating them and are provided at an intermediate point with knurled rollers 264 which are engaged by spring members 265 for holding the set screws releasably in any adjusted position to which they may be turned.

Between the porous absorbent member 261 and the roller 255, I have provided a vibrating roller 266 mounted between a bellcrank lever 267 at the near side of the machine and a lever 267a at the far side of the machine which are pivotally mounted in position upon the arms 256 so as to enable the roller 266 to move up and down for engagement alternatively with the roller 255 and the absorbent member 261. Upon the other arm of the bellcrank lever 267, I have provided a roller 268 in position to engage the cams 60 and 61 so as to be displaced upwardly thereby. The bellcrank lever 267 is provided with a spring 269 serving normally to move the bellcrank lever to the limit of its motion in counterclockwise direction in Fig. 7 for holding the roller 266 normally in engagement with the roller 255. Upon each complete revolution of the drum 52, the cams 60 and 61 give the roller 268 an outward impulse for carrying the roller 266 out of engagement with the roller 255 and into engagement with the absorbent member 261 in the receptacle 260.

In the arrangement shown, the roller 266 is formed of sponge rubber with the pores of the rubber open at the surface of the roller so as to enable the roller readily to absorb a quantity of the ink repellent upon each contact with the absorbent member 261. In operation, the absorbent member 261 is to be adjusted vertically so as to cause the roller 266 to press thereon so as to flatten the roller more or less for expediting the absorption of the ink repellent by the roller 266.

My improved means for applying ink upon the master sheet 95 carried by the drum portion 56 of greater diameter comprises a heavy plate 270 in the form of an angle extending across the machine in position to be supported by the frame bar 50. As is clearly shown in Fig. 3, the frame bar 50 is provided with two heavy set screws, 271, adapted by engagement with notches 272 in the plate 270 to secure said plate 270 releasably in position. At its opposite ends, the plate 270 is provided with upstanding portions 273, having a fountain roller 274 journaled between them. A heavy scraper plate 275 is also pivotally mounted between the standard portions 273, a set screw 276 being provided for pressing the plate 275 adjustably against the bottom face of the roller 274. In the arrangement shown, the set screw 276 is secured by means of screw threads in a lug 277' formed integrally with the plate 270 at its middle portion. The arrangement is such that when a supply of ink is provided between the plate 275 and the roller 274, a film of ink of controlled thickness is carried around by the roller 274 when it is rotated in counterclockwise direction in Fig. 12.

For taking ink from the roller 274, I have provided a vibrating distributor roller 277 which is journaled between two bowed arms 278 pivotally mounted on the standards 273 respectively, the arrangement being such that when the arms are swung to the limit of their motion in clockwise direction in Fig. 12, the roller 277 is brought into operative engagement with said fountain roller 274. The arms 278 are connected by coiled springs 279 with the plate 270 for urging the arms normally to the position in which the roller 277 engages the roller 274.

Rotary movement of the roller 274 is brought about at timed intervals by the use of a pawl 280 which is pivotally mounted on one of the arms 278 (see Fig. 12) adapted by engagement with a ratchet wheel 281 carried by the roller 274 to give said roller a limited rotary movement in counter-clockwise direction in said figure when the arms 278 are swung in counter-clockwise direction for moving the roller 277 out of engagement with said roller 274.

The means provided for swinging the arms 278 upwardly in counter-clockwise direction in Fig. 12 comprises a roller 282 extending across the machine in front of the roller 277, such roller 282 being journaled between arms 283 pivotally mounted on a cross bar 284 extending between the standards 44 and 45. The arms 283 are normally urged to the limit of their swinging movement toward the drum 52 by coiled springs 285 interposed between said arms and lugs 286 extending inwardly from the standards 44 and 45, and said arms are moved outwardly away from the drum (toward the left in Fig. 12) by rollers 287 carried by said arms in position to engage cams 64 and 76 respectively. In the arrangement as shown in Fig. 5a, the roller 282 is journaled between the arms 283 by means of a sleeve 282a which is rotatably mounted at its ends upon a bar or shaft 282b mounted in said arms.

The arrangement as above described is such that when the rollers 287 are in engagement with the low portions of the cams 64 and 76, said roller 282 stands in spaced relation to the roller 277 (see Fig. 13) but that when the rollers 287 are engaged by the high portions of said cams the arms 283 are swung toward the left in said Figs. 12 and 13, serving to carry the roller 282 into engagement with the roller 277, and serving also to move said roller 277 upwardly out of engagement with the fountain roller 274. The arrangement further is such that the roller 282 in its inwardly swung position engages the ink pad or blanket 129 carried by the drum section 57 of smaller diameter, and that said roller in its outwardly swung position stands in spaced relation to the master sheet 95 carried by the drum section 56 of greater diameter.

In the arrangement shown, the roller 282 is driven continuously by a gear 288 carried by the roller (see Fig. 2), such gear 288 meshing with an idler gear 289, mounted on a lug 289a, which in turn meshes with a second idler gear 290 mounted on a lug 290a, such gear 290 meshing with the large gear 73 carried by the drum. The arrangement is such that the roller 282 is driven at substantially the same surface speed as that of the ink pad 129 carried by the drum portion 57. As is clearly shown in Fig. 2, the gear 288 is positioned substantially on the line of centers between the gear 289 and the cross bar 284 about which the arms 283 swing. This arrangement enables the gear 288 to be given a slight movement toward and away from the drum while in mesh with the gear 289 without interfering with the smooth meshing of the parts.

Means is also provided for giving the roller 282 longitudinal movements with respect to the blanket or pad 129 and with respect to the roller 277 for assisting in the cutting of the ink and in the distribution of the ink along the cooperating rollers. This means comprises a cam member 291 carried by the roller 282 (see Fig. 29) such cam member having a compound cam groove 292 into which a swiveled follower 293 extends, as shown in Fig. 28, such follower 293 being rotatably mounted on a bracket 294 which in turn is fixedly mounted on one of the arms 283, as is shown in Figs. 5 and 27. The arrangement is such that upon one revolution of the cam the cam and the roller 282 are moved longitudinally in one direction and that upon the next revolution the cam and roller are moved in the reverse direction, such reciprocation of the roller continuing without break during the rotation of said roller.

By the use of the mechanism as just described, ink is taken from the fountain comprising the roller 274 and the adjustable plate 275 and is distributed by the co-operation of the rollers 274, 277 and 282. The amount of the ink is controlled by the pressure of the plate 275 on the roller 274, the roller 274 being given only a comparatively small part of a complete revolution upon each actuation of the roller by the pawl 280.

Since the roller 282 is given a complete reciprocation back and forth for each two revolutions of the roller and in view of the fact that said roller 282 is given a considerable number of revolutions during each revolution of the drum, it will be appreciated that the ink as applied to the ink pad 129 on the drum section 57 is quite thoroughly worked and cut and is applied very smoothly and evenly upon the pad.

For taking the ink from the pad 129 to which it has been applied by the rotating and longitudinally moving roller 282, and applying such ink even more uniformly to the master sheet on the drum portion 56, I have provided a form roller 295 which is journaled between two arms 296, one of said arms being pivotally mounted on the lug 290a, and the other of which is pivotally mounted upon a lug 297 extending inwardly from the standard 44 as is clearly shown in Fig. 5. These arms 296 are connected by coiled springs 298 with the shaft or bar 284, such springs serving normally to urge the form roller 295 toward the drum 52. As is clearly shown in Fig. 7, each of the arms 296 is provided with a set screw 299 adjustably mounted in position to engage one of the lugs 286 for limiting the movement of the form roller toward the right in said Fig. 7. The arrangement of the parts is such that the form roller is pressed by the springs 298 yieldingly against the pad or blanket 129 on the drum section 57 so as to take ink therefrom and then in turn is pressed against the master sheet 95 on the drum section 56 so as to apply the ink to said master sheet. The set screws 299 are provided for controlling the degree of pressure of the form roller 295 on the pad 129, said set screws being out of engagement with the lugs 286 at the time when the form roller is in engagement with the master sheet on the drum section 56. Rollers 300 are provided on the arms 296 in position by engagement with certain of the cams as above described to carry the form roller smoothly and evenly from one to the other of said drum sections 56 and 57, which are in spaced relation circumferentially with respect to each other and are of different diametrical size, as hereinbefore set forth. The roller 300 at one side of the machine engages the cams 60 and 61 for such bridging action, while the roller 300 at the opposite side engages the cams 70 and 71.

Means is provided for moving the form roller to the left in Fig. 7 away from the drum when the lever 186 is given an operative stroke downwardly. This means comprises a link 301 pivotally connected at its lower end with said lever 186 and pivotally connected at its upper end with a downwardly bowed arm 302 which is non-rotatably connected with a rock shaft 303. The shaft 303 is provided at opposite sides of the machine with short arms or lugs 304 which are adapted by engagement with rollers 305 carried by the arms 296 to swing said arms 296 towards the left in Fig. 7 for carrying the form roller 295 out of position for engaging the drum when said shaft 303 is given a rotary movement in clockwise direction in said Fig. 7 by a downward stroke of the lever 186. In Fig. 7 the arms 304 are shown out of engagement with the rollers 305 corresponding with the normal raised position of the lever 186, while in Fig. 8 the arms 304 are shown to have displaced the rollers 305 and the arms 296 against the action of the springs 298 for carrying the form roller 295 away from the drum.

In operation, a pile of copy sheets is placed on the table 134, with the margin bars 153 engaging the sides of the pile and the margin bar 144 engaging the outer end face of the pile of sheets, the table and the pile of sheets being supported by the springs 141 so as to hold the top sheet in engagement with the intermittently driven rollers 169 and with the overlying fingers 163. When the motor 83 is set into operation, the drum 52 begins to rotate in counter-clockwise direction in Fig. 2, so as to carry the rotatably mounted cams around for operating the various actuated parts in timed relation. The pile of copy sheets is first moved downwardly by the action of the mutilated roller 177 and the top sheet is buckled upwardly at its intermediate portion so as to free the front edge portion of the sheet from the fingers 163, whereupon said mutilated roller is rotated in the opposite direction for permitting the sheet to straighten out on top of the fingers. The rollers 169 are then actuated for carrying the copy sheet forwardly into engagement with the stop device comprising the cross bar 220, such stop device being released for renewed forward movement with the drum just at the time when the leading edge portion of the drum section 56 arrives opposite the impression roller 210 so as to cause the copy sheet to be forwarded for delivery to the tray 241. Just as the copy sheet passes the impression roller the stripper bar 232 is moved outwardly for insuring that the leading edge of the copy sheet shall pass underneath the backwardly pointing guiding bars 248.

As the master sheet carried by the drum section 56 moves on with the drum, the master sheet is brought into engagement with the felt covered roller 255 which applies a very light film of ink repellent to the face of the master sheet, such roller 255 having had a supply of ink repellent fed thereto by the roller 266 from the receptacle 260. As the master sheet moves on with the drum it receives a supply of ink from the form roller 295 for application to the next following copy sheet fed past the impression roller. As is explained hereinabove, the ink applied by the form roller to the master sheet is taken by the form roller from the ink pad 129, carried by the drum section 57, having been applied to said pad 129 by the vibrating roller 282.

Whenever the lever 186 is moved downwardly during the operation of the machine, the drum continues to rotate without any change in the operation of the stop device comprising the cross bar 220, in the operation of the stripper device comprising the plate or bar 232, or in the operation of the repellent applying mechanism. The downward movement of the lever 186, however, causes a movement of the impression roller out of position for operative engagement with the drum, causes a stoppage of the feeding of the copy sheets to the drum, and causes the form roller 295 to move out of position for engagement with the drum. The feed of ink to the drum section 57 is not interfered with, but the transfer of the ink from the pad 129 on the drum section 57 to the master sheet on the drum section 56 is stopped. Upon a movement of the lever 186 again to its raised position as shown in Fig. 7, all of the operating mechanisms of the machine are thrown again into operation so as to cause the machine to proceed substantially the same as if the operation had not been discontinued.

While I prefer to employ the form and arrangement of parts as shown in my drawings and as above described, it is to be understood that my invention is not limited to such arrangement, except so far as the claims may be so limited, it being understood that changes might well be made in the form and arrangement of the parts without departing from my invention.

I claim:

1. A sheet feeding mechanism comprising in combination a table movable up and down for movably supporting a pile of sheets thereon, means positioned above the table adapted by engagement with the top sheet of said pile of sheets to limit the upward movement of the table, yielding means adapted normally to press said table and pile of sheets yieldingly upward to the limit of their motion, rotary means above said table at opposite sides thereof positioned normally in spaced relation to the top sheet of said pile and adapted by rotary movement in one direction to give the engaged portion of said top sheet an edgewise movement so as to uncover an edge portion of the next lower sheet and adapted by rotary movement thereafter in the opposite direction to move said engaged portion of the top sheet forwardly and adapted then to move again into spaced relation to the pile, means for giving said rotary means rotary movements successively in opposite directions, and means adapted upon the retraction of said top sheet to engage said next lower sheet at the exposed portion thereof for partially separating said top sheet from the pile.

2. A sheet feeding mechanism comprising in combination a table movable up and down for movably supporting a pile of sheets thereon, means positioned above the table adapted by engagement with the top sheet of said pile of sheets to limit the upward movement of the table, yielding means adapted normally to press said table and pile of sheets yieldingly upward to the limit of their motion, a mutilated rubber roller rotatably mounted above said table and standing normally out of engagement with the pile of sheets, means for giving said mutilated roller rotary movement in one direction for bringing a face portion of the roller into engagement with said top sheet and for moving the engaged portion of said top sheet edgewise so as to uncover an edge portion of the next lower sheet and then for giving said roller rotary movement in the opposite direction for moving said engaged portion of the top sheet forwardly, and means supported from said table and movable vertically with respect thereto adapted when said next lower sheet is exposed to engage the top face of said next lower sheet and thus partially separate said top sheet from the pile.

3. A sheet forwarding mechanism comprising in combination a table movable up and down for movably supporting a pile of sheets thereon, roller means positioned above the table adapted by engagement with the top sheet of said pile of sheets to limit the upward movement of the table, yielding means adapted normally to press said table and pile of sheets upwardly into engagement with said roller means, rotary means above said table at opposite sides thereof positioned normally in spaced relation to the top sheet of said pile and adapted by rotary movement in one direction to give the engaged portion of said top sheet an edgewise movement so as to uncover an edge portion of the next lower sheet and adapted by rotary movement thereafter in the opposite direction to move said engaged portion of the top sheet in the opposite direction, means adapted upon the retraction of said top sheet to engage said next lower sheet at the exposed portion thereof for partially separating said top sheet from the pile, means for giving said rotary means rotary movements successively in opposite directions, and means for giving said roller means rotary movements in timed relation for carrying the top sheet forwardly edgewise with respect to the pile of sheets when it has been partially separated from the pile.

4. A sheet feeding mechanism comprising in combination a table movable up and down for movably supporting a pile of sheets thereon, roller means positioned above the table adapted by engagement with the top sheet of said pile of sheets to limit the upward movement of the table, yielding means adapted normally to press said table and pile of sheets upwardly into engagement with said roller means, stop means on said table against which the rear ends of said sheets abut, a mutilated roller rotatably mounted above said table and positioned normally out of engagement with the pile of sheets, means for giving said mutilated roller rotary movement in one direction for bringing a face portion of the mutilated roller into engagement with said top sheet and for moving the engaged portion of said top sheet edgewise backwardly so as to buckle the intermediate portion of said top sheet upwardly and to uncover the forward edge portion of the next lower sheet and then for giving said mutilated roller rotary movement in the opposite direction for straightening out said top sheet by a forward movement of its front edge portion, means adapted upon the buckling of said top sheet to engage said next lower sheet at the exposed front edge portion thereof for partially separating said top sheet from the pile, and means for giving said first-named roller means rotary movement in timed relation for carrying the partially separated top sheet forwardly edgewise.

5. A sheet feeding mechanism comprising in combination a table for supporting a pile of sheets, a finger extending inwardly at the forward edge of the table and movable vertically for yieldingly engaging the top sheet of the pile of sheets on the table, rotary means above said table adapted by rotary movement in engagement with said top sheet to pull the forward edge portion of the sheet backwardly out of engagement with said finger and to buckle the intermediate portion of the sheet upwardly, means for giving said rotary means an operative rotary movement for buckling the sheet, and means adapted by operative engagement with said top sheet after its disengagement from said finger to forward said top sheet edgewise from the pile.

6. A sheet feeding mechanism comprising in combination a table for supporting a pile of sheets thereon, a finger extending inwardly at the forward edge of the table and movable vertically for yieldingly engaging the top sheet of the pile of sheets on the table, rotary means above said table at opposite sides thereof adapted by rotary movement in one direction to engage the top sheet of the pile and to move the engaged portion of the sheet backwardly from under said finger for permitting the finger to engage the next lower sheet and adapted then by rotary movement in the opposite direction to move the engaged portion of said top sheet forwardly into position above said finger, and means for giving said rotary means rotary movements successively in opposite directions.

7. A sheet feeding mechanism comprising in combination a frame, a table mounted on said frame and movable up and down thereon for supporting a pile of sheets, a finger mounted on said frame and movable up and down in position to extend over said table in engagement with the top sheet of said pile of sheets, yielding means normally pressing said finger downwardly on said pile, roller means positioned above the table adapted by engagement with the top sheet of said pile to limit the upward movement of the table, yielding means adapted normally to press said table and pile of sheets upwardly into engagement with said roller means, a mutilated roller rotatably mounted above said table and positioned normally in spaced relation to said pile of sheets, means for giving said mutilated roller rotary movement in one direction for bringing a face portion of the mutilated roller into engagement with said top sheet and for moving the engaged portion of said top sheet edgewise backwardly out of contact with said finger which then engages the forward edge of the next lower sheet and for thereafter giving said mutilated roller rotary movement in the opposite direction for moving said engaged portion of the top sheet again forwardly into position above said finger, and means for giving said first-named roller means rotary movements in timed relation for carrying the several successive top sheets forwardly edgewise from the table.

8. In a sheet feeding mechanism, the combination of a table for supporting a pile of sheets thereon, rotary means above said table adapted by rotary movement in engagement with the top sheet of the pile to pull the forward edge portion of the sheet backwardly so as to buckle the intermediate portion of the sheet upwardly, means comprising a cam and a follower actuated by said cam against the action of a spring for giving said rotary means an operative rotary movement for buckling the sheet, means adapted upon the buckling of said top sheet to engage the next lower sheet for partially separating said top sheet from the pile, means comprising a second cam and a second follower actuated by said second cam against the action of a second spring adapted by operative engagement with said top sheet after its partial separation from the pile to forward said sheet edgewise from the pile, a pivotally mounted lever, means connected with said lever for actuation thereby for holding said followers out of operative engagement with said cams for stopping the feed of sheets from said pile, and yielding means normally urging said lever to the position at which said followers have operative engagement with their cams.

9. In a sheet feeding mechanism, the combination of a table for supporting a pile of sheets thereon, rotary means above said table adapted by rotary movement in engagement with the top sheet of the pile to pull the forward edge portion of the sheet backwardly so as to buckle the intermediate portion of the sheet upwardly, means comprising a cam and a follower actuated by said cam against the action of a spring for giving said rotary means an operative rotary movement for buckling the sheet, means adapted upon the buckling of said top sheet to engage the next lower sheet for partially separating said top sheet from the pile, means comprising a second cam and a second follower actuated by said second cam against the action of a second spring adapted by operative engagement with said top sheet after its partial separation from the pile to forward said sheet edgewise from the pile, a pivotally mounted lever, yielding means normally urging said lever to the position it occupies during the normal operation of the machine, latch means for holding said lever releasably in changed position against the action of said yielding means, and means connected with said lever adapted when the lever is latched out of normal position to hold said followers out of operative engagement with said cams so as to stop the feed of sheets from said pile.

10. In a sheet feeding mechanism, the combination of a table for supporting a pile of sheets thereon, rotary means above said table adapted by rotary movement in engagement with the top sheet of the pile to pull the forward edge portion of the sheet backwardly so as to buckle the intermediate portion of the sheet upwardly, means comprising a cam and a follower actuated by said cam against the action of a spring for giving said rotary means an operative rotary movement for buckling the sheet, means adapted upon the buckling of said top sheet to engage the next lower sheet for partially separating said top sheet from the pile, means comprising a second cam and a second follower actuated by said second cam against the action of a second spring adapted by operative engagement with said top sheet after its partial separation from the pile to forward said sheet edgewise from the pile, a pivotally mounted lever, means adjacent to said lever and actuated by the first portion of an operative stroke of the lever to move said first-named follower out of operative engagement with its cam and actuated by a later portion of said operative stroke to move said second follower out of operative engagement with its cam, and yielding means normally urging said lever to the position at which said followers have operative engagement with their cams.

11. A sheet feeding mechanism comprising in combination a table movable up and down for movably supporting a pile of sheets thereon, roller means positioned above the table adapted by engagement with the top sheet of said pile of sheets to limit the upward movement of the table, yielding means adapted normally to press said table and pile of sheets upwardly into engagement with said roller means, a finger extending over the forward edge of the table in position to press downwardly on the top sheet of said pile, rotary means above said table positioned normally in spaced relation to the top sheet of said pile of sheets and adapted by rotary movement in one direction to engage said top sheet and to give the engaged portion of the sheet an edgewise movement backwardly out of engagement with said finger so as to uncover the front edge portion of the next lower sheet and adapted by rotary movement in the opposite direction to move said engaged portion of the top sheet again forwardly into position above said finger, means comprising a cam and a follower actuated by said cam against the action of a spring for giving said rotary means alternate rotary movements in opposite directions, and means comprising a second cam and a second follower actuated by said second cam against the action of a second spring serving through the medium of an interposed free-wheeling clutch to drive said roller means in the direction for carrying said top sheet away from said pile.

12. A sheet feeding mechanism comprising in combination a table movable up and down for movably supporting a pile of sheets thereon, roller means positioned above the table adapted by engagement with the top sheet of said pile of sheets to limit the upward movement of the table, yielding means adapted normally to press said table and pile of sheets upwardly into engagement with said roller means, a finger extending over the forward edge of the table in position to press downwardly on the top sheet of said pile, rotary means above said table positioned normally in spaced relation to the top sheet of said pile of sheets and adapted by rotary movement in one direction to engage said top sheet and to give the engaged portion of the sheet an edgewise movement backwardly out of engagement with said finger so as to uncover the front edge portion of the next lower sheet and adapted by rotary movement in the opposite direction to move said engaged portion of the top sheet again forwardly into position above said finger, means comprising a cam and a follower actuated by said cam against the action of a spring for giving said rotary means alternate rotary movements in opposite directions, means comprising a second cam and a second follower actuated by said second cam against the action of a second spring serving through the medium of an interposed free-wheeling clutch to drive said roller means in the direction for carrying said top sheet away from said pile, a pivotally mounted lever, a spring normally holding said lever at the limit of its movement in one direction, latch means for holding said lever releasably at the limit of its movement in the opposite direction, and means connected with said lever and actuated by the first portion of an operative stroke of the lever to move said first-named follower out of operative engagement with its cam and actuated by a later portion of said operative stroke to move said second follower out of operative engagement with its cam, the arrangement being such that upon the movement of the lever against the action of said spring said followers are moved through and beyond their operative stroke movements out of engagement with their cams and the top sheet is drawn out of engagement with said finger and that upon the return movement of the lever by the spring said followers are restored to their operative cam engaging positions and said top sheet is moved forward into position above said finger ready for the next succeeding actuation of said roller means.

13. A sheet feeding mechanism comprising in combination a housing of sheet metal providing oppositely disposed standard portions at the sides of the machine having vertical slots therein, a sheet metal panel in horizontal position between said standards having its side edge portions turned downwardly in the form of vertical flanges, vertically positioned arms connected rigidly wtih said flanges having rollers rotatably mounted thereon in engagement with said slots for guiding said panel in its vertical movements with respect to said standards, long coiled springs connected with the lower end portions of said arms and with the housing at a considerable distance above the panel for yieldingly supporting said panel from the housing, and rollers rotatably mounted on the housing at opposite sides of said panel adapted by engagement with said arms to hold the panel centered transversely of the housing.

14. A sheet feeding mechanism comprising in combination a table for supporting a pile of sheets thereon, a feed roller normally engaging the top sheet of said pile, means for rotating said feed roller for moving the top sheet forwardly, rotary means normally out of engagement with said pile of sheets adapted upon rotary movement to engage the top sheet, and means for rotating said rotary means first in the direction for moving the front edge portion of the top sheet backwardly for buckling the intermediate portion of the sheet upwardly into the form of a loop and for then rotating said rotary means in the opposite direction for straightening out the sheet, said rotary means being adapted during the production and continuance of the loop to hold said feed roller and said pile of sheets out of operative relation to each other.

15. A sheet feeding mechanism comprising in combination a table for supporting a pile of sheets thereon, a feed roller normally engaging the top sheet of said pile, means for rotating said feed roller for moving the top sheet forwardly, a mutilated roller extending across above said pile of sheets and normally standing in spaced relation to the top sheet adapted upon rotary movement to engage the top sheet, and means for rotating said mutilated roller first in the direction for moving the front edge portion of the top sheet backwardly for buckling the intermediate portion of the sheet upwardly into the form of a loop and for then rotating said mutilated roller in the opposite direction for straightening out the sheet, said mutilated roller serving during the production and continuance of the loop to hold said feed roller and said pile of sheets out of operative relation to each other.

16. A sheet feeding mechanism comprising in combination a table for supporting a pile of sheets thereon, a feed roller normally engaging the top sheet of said pile, a mutilated roller extending across above said pile of sheets and normally standing in spaced relation to the top sheet adapted upon rotary movement to engage the top sheet, means for rotating said mutilated roller first in the direction for moving the front edge portion of the top sheet backwardly for buckling the intermediate portion of the sheet upwardly into the form of a loop and for then rotating said mutilated roller in the opposite direction for straightening out the sheet, said mutilated roller serving during the production and continuance of the loop to hold said feed roller and said pile of sheets out of operative relation to each other, and means comprising a one-way clutch for driving said feed roller in the direction for forwarding said top sheet but adapted to yield for permitting the feed roller to rotate freely for forward movement of the sheet independently.

MORRIS P. NEAL.